US008358876B1

(12) United States Patent
Gilra et al.

(10) Patent No.: US 8,358,876 B1
(45) Date of Patent: Jan. 22, 2013

(54) SYSTEM AND METHOD FOR CONTENT AWARE IN PLACE TRANSLATIONS IN IMAGES

(75) Inventors: Anant Gilra, Bangalore (IN); Shmuel Avidan, Brookline, MA (US)

(73) Assignee: Adobe Systems Incorporated, San Jose, CA (US)

( * ) Notice: Subject to any disclaimer, the term of this patent is extended or adjusted under 35 U.S.C. 154(b) by 703 days.

(21) Appl. No.: 12/469,508

(22) Filed: May 20, 2009

(51) Int. Cl.
*G06K 9/32* (2006.01)

(52) U.S. Cl. ......... 382/298; 345/418; 345/58; 345/606; 345/639; 345/661; 382/162; 382/173

(58) Field of Classification Search .................. None
See application file for complete search history.

(56) References Cited

U.S. PATENT DOCUMENTS

| | | | |
|---|---|---|---|
| 4,394,693 A | 7/1983 | Shirley | |
| 5,434,414 A | 7/1995 | Berlad et al. | |
| 5,438,202 A | 8/1995 | Matanzon et al. | |
| 5,559,901 A | 9/1996 | Lobregt | |
| 5,577,179 A * | 11/1996 | Blank | 345/639 |
| 5,732,230 A * | 3/1998 | Cullen et al. | 715/764 |
| 5,768,413 A | 6/1998 | Levin et al. | |
| 5,790,708 A | 8/1998 | Delean | |
| 5,906,005 A | 5/1999 | Nikala et al. | |
| 6,195,445 B1 | 2/2001 | Dubuisson-Jolly et al. | |
| 6,563,964 B1 | 5/2003 | Hallberg et al. | |
| 6,597,411 B1 | 7/2003 | Selby et al. | |
| 6,919,903 B2 | 7/2005 | Freeman et al. | |
| 6,943,807 B2 * | 9/2005 | Xavier | 345/606 |
| 6,985,641 B1 | 1/2006 | Michel et al. | |
| 7,038,185 B1 | 5/2006 | Tumblin et al. | |
| 7,168,038 B2 * | 1/2007 | Lui et al. | 715/229 |
| 7,386,183 B2 | 6/2008 | Tamura | |
| 7,411,628 B2 | 8/2008 | Tian et al. | |
| 7,477,800 B2 | 1/2009 | Avidan et al. | |
| 7,529,429 B2 | 5/2009 | Rother et al. | |
| 7,532,771 B2 | 5/2009 | Taylor et al. | |
| 7,602,398 B2 | 10/2009 | Zhou et al. | |
| 7,747,107 B2 | 6/2010 | Avidan et al. | |
| 7,778,492 B2 | 8/2010 | Ignatchenko et al. | |
| 7,823,211 B2 | 10/2010 | Matsukawa et al. | |
| 8,023,153 B2 | 9/2011 | Bernal et al. | |

(Continued)

OTHER PUBLICATIONS

U.S. Appl. No. 12/184,039, filed Jul. 31, 2008.

(Continued)

*Primary Examiner* — Tsung-Yin Tsai
(74) *Attorney, Agent, or Firm* — Robert C. Kowert; Meyertons, Hood, Kivlin, Kowert & Goetzel, P.C.

(57) ABSTRACT

A system and method for performing content aware cropping or expansion may be applied to translate an object within an image. The object may be selected by defining an approximate bounding box of the object. The method may receive input indicating a lowest priority edge or corner of the object to be translated (e.g., using a drag operation). Respective energy values for pixels in regions of the image adjacent to a region comprising the selected object may be weighted based on their distance from the region and/or lowest priority edge/corner, on a cropping or expansion graph, and/or on the translation dimension and direction. Relative costs may be determined for seams of these regions dependent on the energy values. Low cost seams may be removed from one region and replicated in another region, and the region comprising the translated object may be combined with these resized regions in a modified image.

24 Claims, 19 Drawing Sheets

U.S. PATENT DOCUMENTS

| | | | |
|---|---|---|---|
| 8,077,356 | B2 | 12/2011 | Bernal et al. |
| 2002/0006234 | A1* | 1/2002 | Horiuchi .................. 382/295 |
| 2003/0002736 | A1 | 1/2003 | Maruoka et al. |
| 2003/0234866 | A1 | 12/2003 | Cutler |
| 2006/0017739 | A1 | 1/2006 | Fang et al. |
| 2006/0072853 | A1 | 4/2006 | Clarke et al. |
| 2006/0104542 | A1* | 5/2006 | Blake et al. ................ 382/284 |
| 2006/0177150 | A1 | 8/2006 | Uyttendaele et al. |
| 2007/0025637 | A1* | 2/2007 | Setlur et al. ............... 382/276 |
| 2007/0136685 | A1* | 6/2007 | Bhatla et al. ............... 715/800 |
| 2007/0237420 | A1 | 10/2007 | Steedly et al. |
| 2008/0095470 | A1* | 4/2008 | Chao et al. ................. 382/298 |
| 2008/0143744 | A1 | 6/2008 | Agarwala |
| 2008/0198175 | A1 | 8/2008 | Sun et al. |
| 2008/0219587 | A1* | 9/2008 | Avidan et al. .............. 382/276 |
| 2008/0267528 | A1 | 10/2008 | Avidan et al. |
| 2009/0033683 | A1 | 2/2009 | Schiff et al. |
| 2009/0290794 | A1* | 11/2009 | Marchesotti .............. 382/173 |
| 2009/0317010 | A1* | 12/2009 | Gerhard et al. ............ 382/240 |
| 2010/0013827 | A1* | 1/2010 | Fillion et al. .............. 345/418 |
| 2010/0124371 | A1 | 5/2010 | Jiang et al. |
| 2010/0142853 | A1* | 6/2010 | Fillion et al. .............. 382/298 |
| 2010/0232729 | A1* | 9/2010 | Peleg et al. ................ 382/298 |
| 2010/0266208 | A1 | 10/2010 | Downing et al. |
| 2011/0200274 | A1 | 8/2011 | Luo et al. |
| 2011/0211771 | A1* | 9/2011 | Rubenstein et al. ........ 382/299 |
| 2012/0092357 | A1* | 4/2012 | Wang et al. ................ 345/581 |

OTHER PUBLICATIONS

Shai Avidan, et al., "Seam Carving for Content-Aware Resizing", International Conference on Computer Graphics and Interactive Techniques, ACM SIGGRAPH 2007 papers, San Diego, California Session: Image slicing & stretching, Article No. 10, Year of Publication: 2007, ISSN:0730-0301.

Michael Rubinstein, et al., "Improved seam carving for video retargeting", From SIGGRAPH '08, International Conference on Computer Graphics and Interactive Techniques, ACM SIGGRAPH 2008 papers, Los Angeles, California, Session: Image collections and video, Article No. 16, Year of Publication: 2008, ISSN:0730-0301.

Santella, A., Agrawala, M., Decarlo, D., Salesin, D., and Cohen, M. 2006. "Gaze-based interaction for semiautomatic photo cropping". In ACM Human Factors in Computing Systems (CHI 2006), 771-780.

Wang, J., and Cohen, M. 2006. "Simultaneous Matting and Compositing". Microsoft Research Technical Report, MSR-TR-2006-63 (May).

U.S. Appl. No. 12/200,637, filed Aug. 28, 2008, Adobe Systems Incorporated, all pages.

alZahir, S., "A perceptually perfect image resizing scheme," International Conference on Consumer Electronics, 2005.. 2005 Digest of Technical Papers. Volume , Issue , Jan. 8-12, 2005 pp. 83-84.

U.S. Appl. No. 12/250,406, filed Oct. 31, 2008, Adobe Systems Incorporated, all pages.

U.S. Appl. No. 12/469,486, filed May 20, 2009, Adobe Systems Incorporated, all pages.

U.S. Appl. No. 12/551,178, filed Aug. 31, 2009, Adobe Systems Incorporated, all pages.

Itti L et al. "A Model of Saliency-Based Visual Attention for Rapid Scene Analysis" IEEE Transactions on Pattern Analysis and Machine Intelligence, IEEE Service Center, Los Alamitos, CA, US, vol. 20, No. 11 Nov. 1, 1998, pp. 1254-1259.

Wang, et al. "Optimized Scale-and-Stretch for Image Resizing," ACM Transactions on Graphics, vol. 27, No. 5, Art. 118, Dec. 2008, pp. 118-1 to 118-8.

Perez et al., 2003. Poisson Image Editing. SIGGRAPH'03. ACM, New York, NY, pp. 313-318.

Lui et al., "Automatic Estimation and Removal of Noise from a Single Image," IEEE Transactions on Pattern Analysis and Machine Intelligence, Vol. 30, No. 2, February 2008, 16 pages.

Suh et al., 2003. Automatic thumbnail cropping and its effectiveness. UIST '03: Proceedings of the 16th annual ACM symposium on User interface software and technology, ACM Press, New York, NY, USA, pp. 95-104.

Chen et al., 2003. A visual attention model for adapting images on small displays. Multimedia Systems 9, 4, pp. 353-364.

Agarwala et al., "Interactive digital photomontage," ACM Trans. Graph. 23, 3, 294-302, 2004.

Jacobs et al. 2003. Adaptive grid-based document layout. Proceedings of ACM SIGGRAPH, pp. 838-847.

Liu et al., 2005. Automatic image retargeting with fisheye-view warping. ACM UIST, pp. 153-162.

Setlur et al., 2005. Automatic image retargeting. Mobile and Ubiquitous Multimedia (MUM), ACM Press.

Gal et al., 2006. Feature aware texturing. Eurographics Symposium on Rendering.

Sun et al. 2005. Image completion with structure propagation. Proceedings of ACM SIGGRAPH, pp. 861-868.

Jia et al., 2006. Drag-and-drop pasting. Proceedings of SIGGRAPH, 6 pages.

Zomet, A., Levin, A., Peleg, S., and Weiss, Y., "Seamless image stitching by minimizing false edges," IEEE Transactions on Image Processing vol. 15, No. 4, Apr. 2006, 969-977.

Criminisi et al., 2003. Object removal by exemplar-based inpainting. IEEE Conference on Computer Vision and Pattern Recognition, pp. 417-424.

Bertalmio et al., 2003. Simultaneous structure and texture image inpainting. Proceedings IEEE Conference on Computer Vision and Pattern Recognition, 13 pages.

Drori et al. 2003. Fragment-based image completion. Proceedings of ACM SIGGRAPH, pp. 303-312.

Hwang and Chien, "Content-aware image resizing using perceptual seam carving with human attention model," 2008 IEEE International Conference on Multimedia and Expo, Apr. 26, 2008, all pages.

Andreadis, I. Amanatiadis, A.; "Digital Image Scaling," Proceedings of the IEEE Instrumentation and Measurement Technology Conference, 2005, May 16-19, 2005, vol. 3, pp. 2028-2032.

Zhang , Mingju; Zhang , Lei; Sun, Yanfeng; Feng,Lin; Ma Weiying; "Auto cropping for digital photographs," IEEE International Conference on Multimedia and Expo, 2005, Publication Date: Jul. 6-8, 2005.

Michael J. Jones, James M. Rehg., "Statistical Color Models with Application to Skin Detection," International Journal of Computer Vision, 46, Jan. 1, 2002, pp. 81-96.

U.S. Appl. No. 12/184,060, filed Jul. 31, 2008, Adobe Systems Incorporated, all pages.

U.S. Appl. No. 12/184,071, filed Jul. 31, 2008, Adobe Systems Incorporated, all pages.

U.S. Appl. No. 12/183,942, filed Jul. 31, 2008, Adobe Systems Incorporated, all pages.

U.S. Appl. No. 12/183,960, filed Jul. 31, 2008, Adobe Systems Incorporated, all pages.

U.S. Appl. No. 12/183,974, filed Jul. 31, 2008, Adobe Systems Incorporated, all pages.

U.S. Appl. No. 12/183,997, filed Jul. 31, 2008, Adobe Systems Incorporated, all pages.

U.S. Appl. No. 12/183,986, filed Jul. 31, 2008, Adobe Systems Incorporated, all pages.

U.S. Appl. No. 12/184,019, filed Jul. 31, 2008, Adobe Systems Incorporated, all pages.

U.S. Appl. No. 12/251,163, filed Oct. 14, 2008, Adobe Systems Incorporated, all pages.

Jacob Stultz, Seam Carving: Parallizing a Novel New Image Resizing Algorithm, May 16, 2008, all pages.

Vladimir Vezhnevets, Vassili Sazonov and Alla Andreeva, "A Survey on Pixel-Based Skin Color Detection Techniques," Proc. Graphicon-2003, pp. 85-92, Moscow, Russia, Sep. 2003.

* cited by examiner

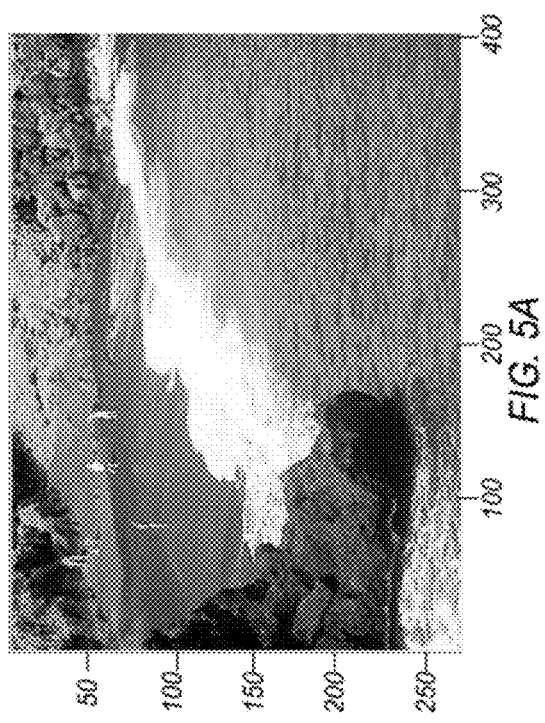
FIG. 5A
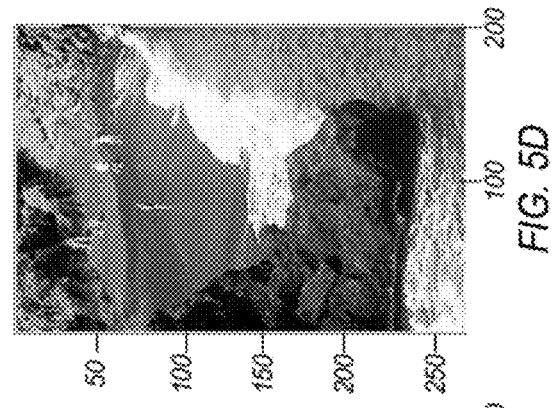
FIG. 5D
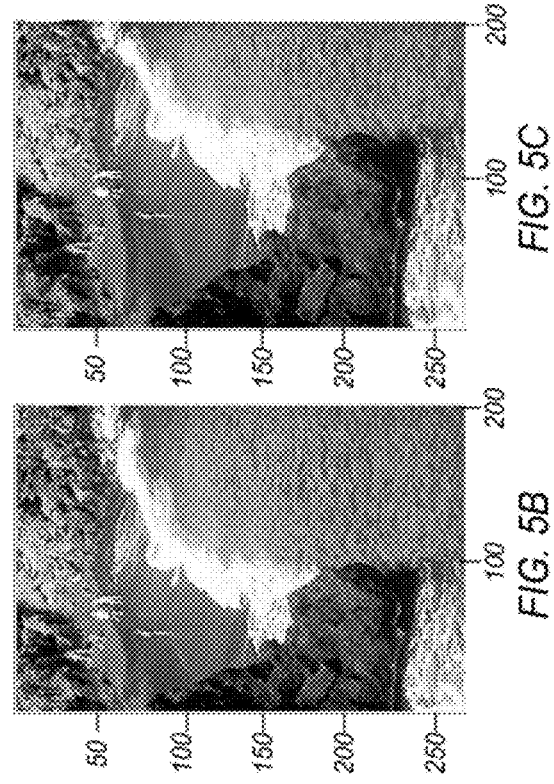
FIG. 5C
FIG. 5B

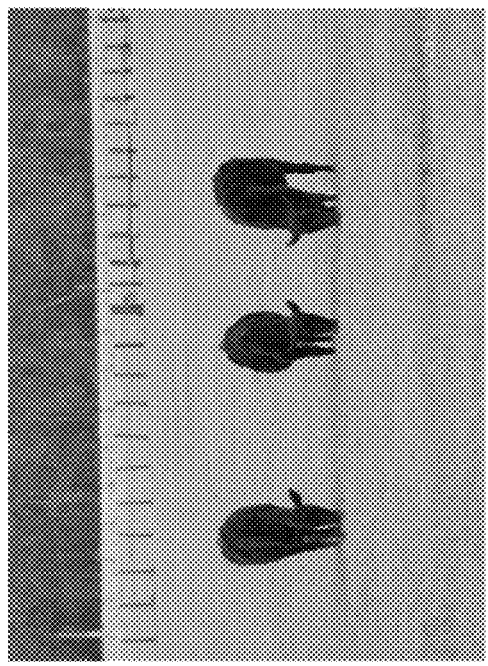
FIG. 6A
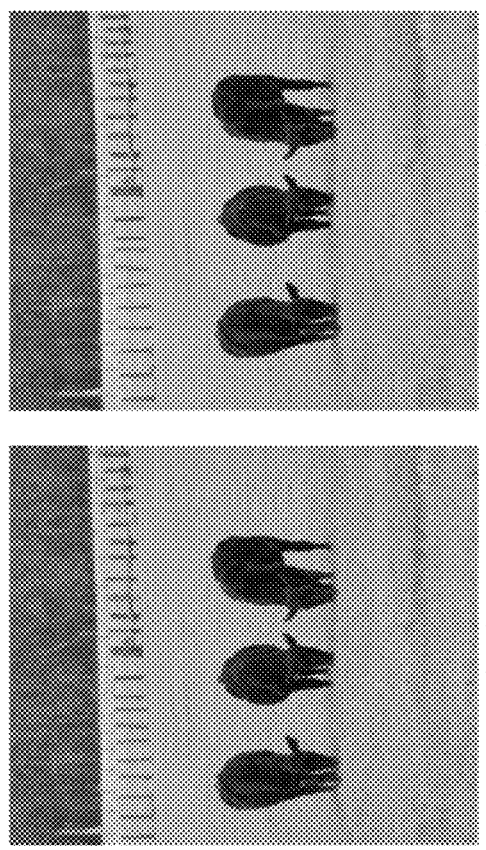
FIG. 6B
FIG. 6C
FIG. 6D

SYSTEM AND METHOD FOR CONTENT AWARE IN PLACE TRANSLATIONS IN IMAGES

BACKGROUND

Description of the Related Art

Resizing images using standard image scaling is often not sufficient since it is oblivious to the image content and typically can be applied only uniformly, resulting in various artifacts or distortions of the input image. Cropping is also of limited use since it can only remove pixels from the image periphery. More effective resizing can only be achieved by considering the image content and not only geometric constraints. Seam carving techniques have been developed which alter the dimensions of an image by removing pixels from the image or adding pixels to the image that are considered to be less important than other pixels of the image, e.g., based on a pixel's value as compared to the value of its neighbors. However, standard seam carving techniques may be computationally expensive and may also produce undesirable artifacts or distortions.

Enhanced seam carving techniques may allow a user to explicitly identify specific areas or objects within an image that should be protected from a seam carving or expansion operation, or that should be the target of such an operation. However, none of these current seam carving techniques provide a way to intelligently crop images. For example, seam carving may remove low energy seams from all over the image or from an explicitly identified area. However, not all high energy seams in those areas may need to be preserved. Standard cropping may not provide a satisfactory solution, since the user may wish to retain some important content in these areas.

SUMMARY

A system and method for performing content aware hybrid seam cropping or content aware hybrid seam expansion (i.e. edge-weighted seam expansion) may be applied to translate an object in place within an image. An image object to be translated within an image may be selected by defining an approximate bounding box of the object (e.g., using a selection tool of a graphical user interface), in some embodiments.

The method may include receive input indicating an amount by which the object is to be translated, a dimension of the translation, and the translation direction. The method may include receiving input indicating a lowest priority edge or corner of the object to be translated. For example, a user may perform a drag operation on the bounding box to indicate the amount of the desired translation, the translation dimension and direction, and/or a lowest priority edge or corner of the selected object.

The method may include determining respective energy values for pixels in regions of the image on either side of a center region comprising the selected object. The respective energy values may be weighted based on the distance of each pixel (or row/column of pixels) from the center region, their distance from the lowest priority edge or corner, on a cropping or expansion graph, and/or on the translation dimension and direction. Relative costs may be determined for seams of these side regions dependent on the energy values.

The method may include removing one or more low cost seams from one side region and replicating one or more low cost seams in the other side region. For example, the method may include dividing the image into three regions in the dimension of the translation (e.g., the image may be divided into three vertical strips if the object is to be translated horizontally or it may be divided into three horizontal strips if the object is to be translated vertically). These three regions may include a center region comprising the selected object, a side region adjacent to the center region in the translation direction, and a side region of the image adjacent to the center region in the direction opposite the translation direction. The method may include applying an edge-weighted seam cropping operation to the side region of the image adjacent to the center region in the translation direction to produce a reduced side region of the image, and applying a resizing operation (e.g., a seam expansion operation) to the side region of the image adjacent to the center region in the direction opposite the translation direction to produce an expanded side region of the image. The method may include combining the center region (translated by the indicated amount) with the reduced side region and the expanded side region to produce a modified image.

In some embodiments, the method may be repeated to further translate the object within the image in a second dimension. In such embodiments, the method may take the modified image described above as its input and may repeat the operations described herein to translate the object in the second dimension. In some embodiments, the methods described herein may be performed first on a lower resolution version of an image to improve performance. In such embodiments, a preview image may be generated reflecting the preliminary results of the application of the methods to the lower resolution version of the image. This preview image may be presented to a user as the user interactively invokes one or more translation operations. When the user is satisfied with the preliminary results, the method may include producing the final results by applying the methods to the higher resolution input image.

The methods described herein may be implemented as program instructions, (e.g., stored on computer-readable storage media) executable by a CPU and/or GPU, in various embodiments. For example, they may be implemented as program instructions that, when executed, implement a content aware translation operation in an image editing application in response to user input. In some embodiments, the image object to be translated may be defined by a user, e.g., through a user interface of the image editing application. In some embodiments, various parameters of the translation operation may be specified by the user (e.g., through such a user interface).

BRIEF DESCRIPTION OF THE DRAWINGS

FIGS. 5A-5D illustrate an example of a resizing operation in which important content is retained, according to one embodiment.

FIGS. 6A-6D illustrate an example of a resizing operation in which important content is repositioned, according to one embodiment.

Figure 1A:
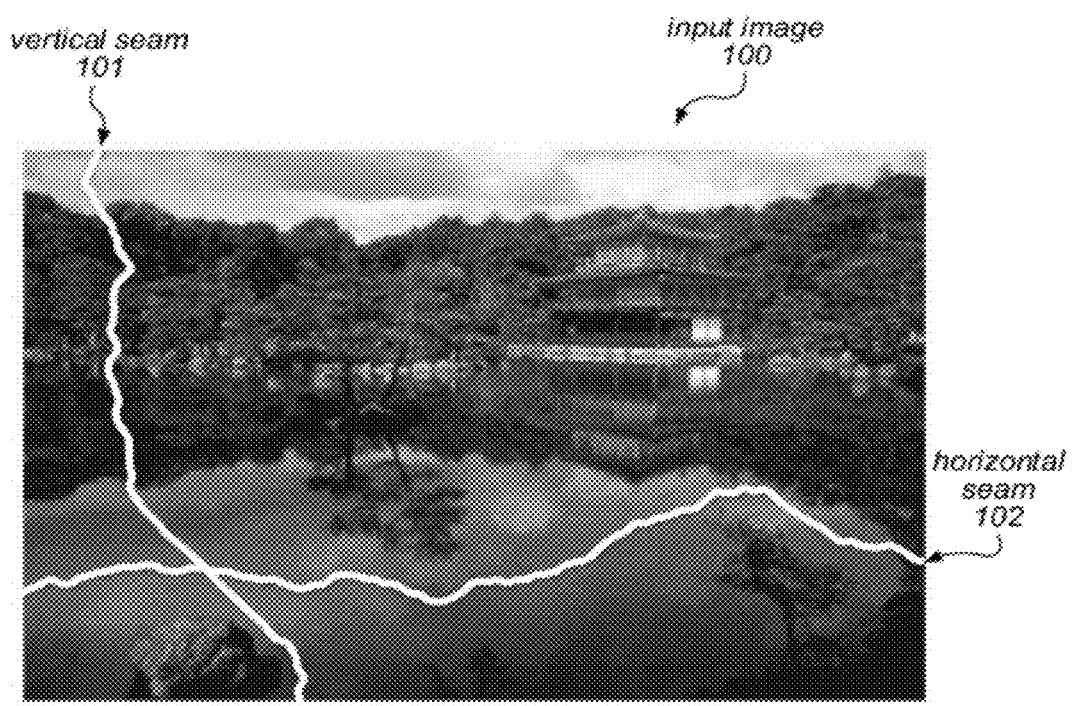
FIG. 1A illustrates two seams of an input image to be resized, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Graphic applications include an ever-increasing number of image editing features, such as various filtering options and resizing operations (e.g., for cropping, expanding, or reducing an image or a portion thereof). Currently available image resizing techniques include scaling techniques and seam-based techniques, also known as seam carving techniques. Seam carving, as described herein, may be used to increase or decrease the size of an image, in various embodiments. For example, given an image, to reduce the width, one or more seams in the image may be identified by a seam carving technique and removed from the image, while to increase the width one or more seams may be identified and replicated in the image. As used herein, the term "seam" refers to a set of pixels along a path from one edge of the image (e.g., the top of the image) to the opposite edge of the image (e.g., the bottom of the image) that satisfies the following two constraints:

1) The seam is monotonic, meaning (in this example) that its path only goes in one direction across the image (e.g., down), and does not reverse directions as it crosses the image (e.g., going down for a while and then up, or vice versa).
2) The seam comprises pixels that are "connected" to each other. In other words, for any given pixel of the seam (in this example), the pixel on the next row must be either directly below the given pixel or diagonally adjacent to the given pixel (e.g., one pixel to the left of the pixel or one pixel to the right of the given pixel on the next row). For example, from any given pixel of the seam to the next pixel of the seam, the path cannot jump to a pixel 20 pixels away in the next row.

In various embodiments, seam carving techniques may be content sensitive, or context aware. For example, given an input image, the data representing the image may be processed to generate an alternate representation of the image, which may be referred to as an energy map, which indicates the importance of each pixel in terms of image resizing. In some embodiments of a content aware seam carving technique, the values mapped to each pixel of the input image by this energy map may be generated dependent on the pixels in its neighborhood, e.g., using a derivative function. For, example, if a white pixel is surrounded by other white pixels, it may not be considered an important pixel (with respect to a resizing operation). This is because if it is removed, it is not likely to be missed. On the other hand, if a white pixel is surrounded by black pixels, then removing it may be very noticeable and may change the content of the image. Therefore, this pixel may be mapped to a higher value by the energy map.

A content aware seam carving technique may in various embodiments assign an energy or weight to every pixel, and may use those values to identify one or more seams having a minimal cost with respect to a resizing operation. In other words, the content aware seam carving technique may use the energy costs of each pixel to identify a path of pixels going from one edge of the image to the opposite edge of the image for which the sum of the energy values has the minimum value. In some embodiments, this determination may be solved efficiently using a technique called dynamic programming or shortest path. Once the lowest-cost seam has been identified, the image may be resized along the seam. For example, if the resizing operation is a reduction operation, the pixels associated with the lowest-cost seam may be removed. In this example, the seam carving operation would remove one pixel per row (because the seam is monotonic), and all the pixels to the right of the seam would be moved one pixel to the left to obtain an image that is one pixel narrower than the input image. By iteratively applying this technique, the image may be reduced to reach a target size and/or aspect ratio. Similarly, if the resizing operation is an expansion operation, the pixels associated with the lowest-cost seam may be replicated, and a copy of each pixel may be inserted into the image to the right of the seam. In this example, the seam carving operation would add one pixel per row, and all the pixels to the right of the seam would be moved one pixel to the right to obtain an image that is one pixel wider than the input image. By iteratively applying this technique, the image may be expanded to reach a target size and/or aspect ratio. Note that in other embodiments, rather than iteratively calculating the lowest-cost seam and duplicating it (e.g., one seam at a time) during an expansion operation, the cost of all seams may be computed up front, and then one or more of the lowest-cost seams may be duplicated until the resizing target is met. In some embodiments, the energy values for the pixels of the image and/or the lowest-cost seam may be recalculated after each iteration (e.g., after the removal or replication of a single seam). In other embodiments, the energy values may be recalculated only after the image has been resized to its target size and/or aspect ratio, or may not be recalculated at all.

Figure 1B:
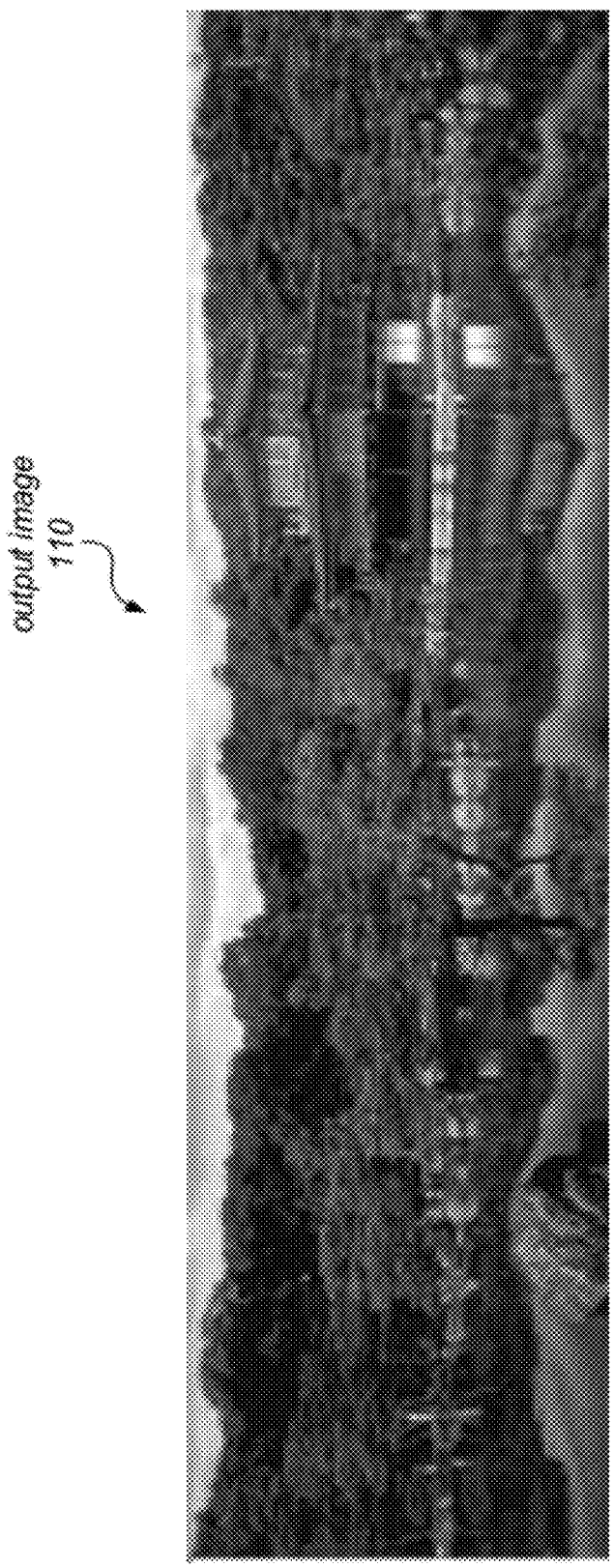
FIG. 1B illustrates an output image after resizing, according to one embodiment.

Seam carving may be further illustrated by way of example in FIGS. 1A and 1B. FIG. 1A illustrates an input image 100, which is to be resized. In this example FIG. 1A is to be resized to a target size with an aspect ratio that is shorter (i.e., smaller in the vertical dimension) and wider (i.e., longer in the horizontal dimension) than input image 100. In this example, seam carving techniques may be applied twice, once in each dimension.

To expand the width of input image 100, one or more low-cost (or lowest-cost) seams of pixels going from top to bottom, such as vertical seam 101, are identified. Input image 100 is then expanded by replicating the pixels of each of the identified vertical seams (e.g., by making a copy of each pixel of the seam and inserting it into the image to the right of the seam). This may produce a resized image as an intermediate result, in some embodiments. To reduce the height of the input image, one or more low-cost (or lowest-cost) horizontal seams, such as horizontal seam 102, are identified. The resized input image 100 may then be reduced by removing the pixels of the identified horizontal seams. An output image 110, resulting from these two resizing operations, is illustrated in FIG. 1B. Note that in other embodiments, the reduction operation may be performed before the expansion operation, the reduction and expansion operations may be performed in parallel, or the resizing operation may alternate between the replication of seams (e.g., one at a time) and the removal of seams (e.g., one at a time) until the target size and/or aspect ratio for the output image is reached.

Figure 2:
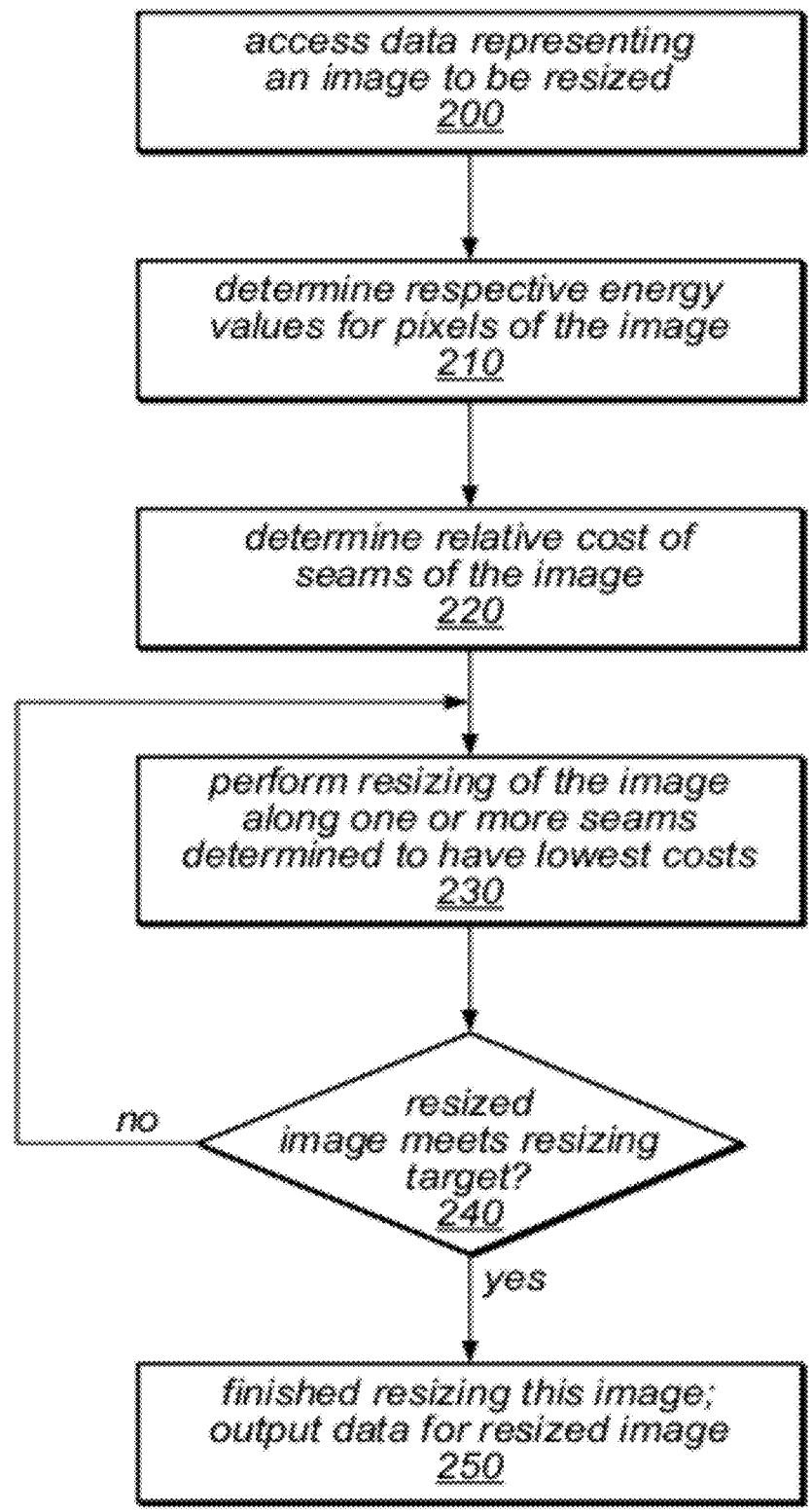
FIG. 2 is a flow chart illustrating a method for resizing images along seams, according to various embodiments.

One method for seam carving is illustrated by the flow chart in FIG. 2. In this example, data representing an image to be resized is accessed, as in 200. This data may be accessed in response to being imported into an application configured for image editing, or may be resident in memory accessible to such an application as a result of being imported previously, or as a result of being created and/or modified by the application prior to the desired resizing operation. Note that, as used herein, the term "image editing application" may refer to a graphic application that is specifically directed to image editing, or to any application that includes an image editing component, according to various embodiments. The data accessed may represent a whole image or a portion of an image that is to be resized, in different embodiments. For example, in one embodiment, a user may select a portion of an image on which to perform a resizing operation using a selecting tool or a cropping tool of an image editing application. The user may also select a target size, expansion/reduction target (e.g., a percentage increase or decrease in one or more dimensions) and/or target aspect ratio for a resizing operation using various user interface elements (e.g., pull-down menus, radio buttons, or alphanumeric input fields), in various embodiments.

In this example, respective energy values may be determined for each of the pixels of image, as in 210. The energy values may be determined as described above (e.g., using a derivative function or another parametric function), or by any of various other methods, including the edge- or corner-weighted methods described in detail below. Dependent on these energy values, the relative cost of various seams of the image may be determined, as in 220. For example, in some embodiments, a cost may be computed for all possible seams of the image, or for the lowest possible seam for each edge pixel of the image, while in other embodiments, the data representing the image may be processed so that only a portion of the seams (e.g., the lowest-cost seams up to a given number or percentage of these seams) may be identified and their costs computed. Note that the cost of each seam may be determined in various ways in different embodiments, such as by calculating a sum, average, or weighted average of the energy values of the pixels making up the seam. In another example, the cost of each seam may be dependent on a maximum energy value for the pixels of the seam. In other words, a seam may be assigned a higher cost due to the presence of even one high-energy pixel in the seam, because removing that pixel may create an undesirable visual artifact.

In the example illustrated in FIG. 2, the method may include resizing the image along one or more of the seams determined to have the lowest costs, as in 230. As described above, if the image is to be reduced, the pixels of an identified low-cost seam (e.g., the lowest-cost seam) may be removed, while if the image is to be expanded, the pixels of an identified low-cost seam (e.g., the lowest-cost seam) may be replicated and inserted adjacent to the identified seam. Additional or alternate actions that may be taken as part of a resizing operation are described in detail below.

If the resizing operation performed in 230 does not result in a resized image that meets its resizing target (e.g., a target for size, percentage increase/decrease, and/or aspect ratio), shown as the negative exit from 240, additional resizing operations (e.g., on each successive next lowest cost seam) may be performed on the image. This is shown as the feedback from 240 to 230. If the resizing operation performed in 230 results in a resized image that meets its resizing target, shown as the positive exit from 240, the method may output data representing the resized image, as in 250. For example, the data may be provided to a display component of the application for display of the resized image to the user and/or the data may be stored as in intermediate image by the image editing application for further processing by the application (or another application) or as a final image (e.g., written to main memory, a file, an archive, etc.). Note that the method illustrated in FIG. 2 may in various embodiments be applied to reduction of an image, expansion of an image, or a combination of reduction and expansion operations in order to resize the image to its target size and/or aspect ratio (as in FIGS. 1A-1B).

As described above, a basic seam carving algorithm may use the sum of absolute gradients of each pixel to calculate seam energy and may consider the seam with the lowest energy to be the optimal seam for removal or replication. Such standard seam carving techniques may produce a resized image with undesirable results, even though the operation may have removed pixels that were determined to be "less important" (e.g., due to the presence of similar pixels nearby). In some embodiments, rather than treating all pixel values as equally important, enhanced methods of seam carving may treat the pixel values corresponding to particular colors or color ranges (e.g., skin tones) as being more important than the values of other pixels or the pixel values corresponding to less frequently used colors or color ranges as being more important than the values of other pixels. In other words, even if the intensities (or gradients) of the pixels of a given seam are low relative to those of other seams, it may be undesirable to remove the seam if it contains pixels having values corresponding to these colors or color ranges. Instead, the energy values (i.e., the importance) of these pixels may be weighted so that they are higher than they would be if they were based solely on the gradient (e.g., on the values of other pixels the neighborhood).

In some embodiments, enhanced seam carving techniques may allow a user to explicitly identify specific areas or objects within an image that should be protected from a seam carving or expansion operation, or that should be the target of such an operation. However, current seam carving techniques do not provide a way to intelligently crop images using seam carving techniques. For example, a user may wish to decrease the size of an image without cropping, i.e. without completely erasing a portion of the image. Seam carving may remove seams from all over the image, but the user may want more control over the portion of the image from which more seams should be removed. In other words, multiple areas in the image may have high energy, but not all of them may need to be preserved. For example, photographs are often taken in a manner such that one or more corners or sides of the image are not focused. Hence in some cases, the user may wish to remove more seams from those corners or sides than from other areas of the image. Complete cropping may not provide a satisfactory solution, since the user may wish to retain some important content in these areas.

The system and methods described herein may allow a user to exercise more control over an image resizing operation by providing content aware hybrid cropping or edge weighted seam expansion and seam carving/expansion functionality dependent on edge- or corner-weighting and/or a configurable cropping tolerance. In various embodiments, the system may provide one or more user interface mechanisms for specifying various inputs to resizing and/or move operations that employ these hybrid content aware seam cropping/expansion and/or standard seam carving/expansion techniques. For example, the system may provide an input mechanism similar in look and feel to an existing selection and/or scaling tool, but having enhanced functionality to support the hybrid seam cropping methods described herein. With one existing user interface mechanism for scaling an image object, when the user moves the mouse to any corner or edge of the object while any type of scaling tool is active, the user is prompted to scale in one or at most two directions at a time (e.g., to the left, right, top, bottom, top left, bottom left, top right, or bottom right) using horizontal, vertical or diagonal arrows. Scaling the object using these eight possibilities may yield the same result for the scaled object itself, but the final placement of the scaled object in the resulting output image may be different for each of these possibilities. For example, if the image object is scaled from the left edge, the size of the image object may be increased or decreased while constraining the right edge of the object, and if the object is scaled from the right edge, the size of the image object may be increased or decreased while constraining the left edge of the object.

In some embodiments, the system described herein may introduce other features to such a user interface, e.g., while an image editing operation that employs content aware hybrid seam cropping is active and/or a modifier key (e.g., a "Ctrl" key) is pressed. For example, in one embodiment, input may be provided to a hybrid seam cropping operation by selecting and then dragging any of the eight corners or edges of an image or image object while a modifier key is pressed, and the output may be different for each of these eight possibilities. In addition, a configurable cropping tolerance in each dimension may give the user further control over the result. As described in more detail below, a hybrid cropping and seam carving operation may involve manipulating the weights of pixels using such a configurable cropping tolerance. In this example, a default weighting may be defined by a linear graph that assigns a lower weight (lower weight means more chances of getting seams carved) to pixels in or near the corner or edge being dragged. These weights may be multiplied by the energy values calculated by a seam carving algorithm, which may affect the cost of each seam of the image. This may result in the seam carving algorithm being dependent not only on the energy levels of each pixel, but also on the distance of each pixel from the dragged edge or corner. In other words, this may increase the chances that more seams in areas close to the dragged edge or corner will be removed (or replicated, for an expansion operation) than seams in other portions of the image or image object. The hybrid seam cropping and carving techniques described herein (sometimes referred to herein as just "hybrid seam cropping") may be applied to various resizing and/or move operations performed by an image editing application, as described in detail below.

Figure 3:
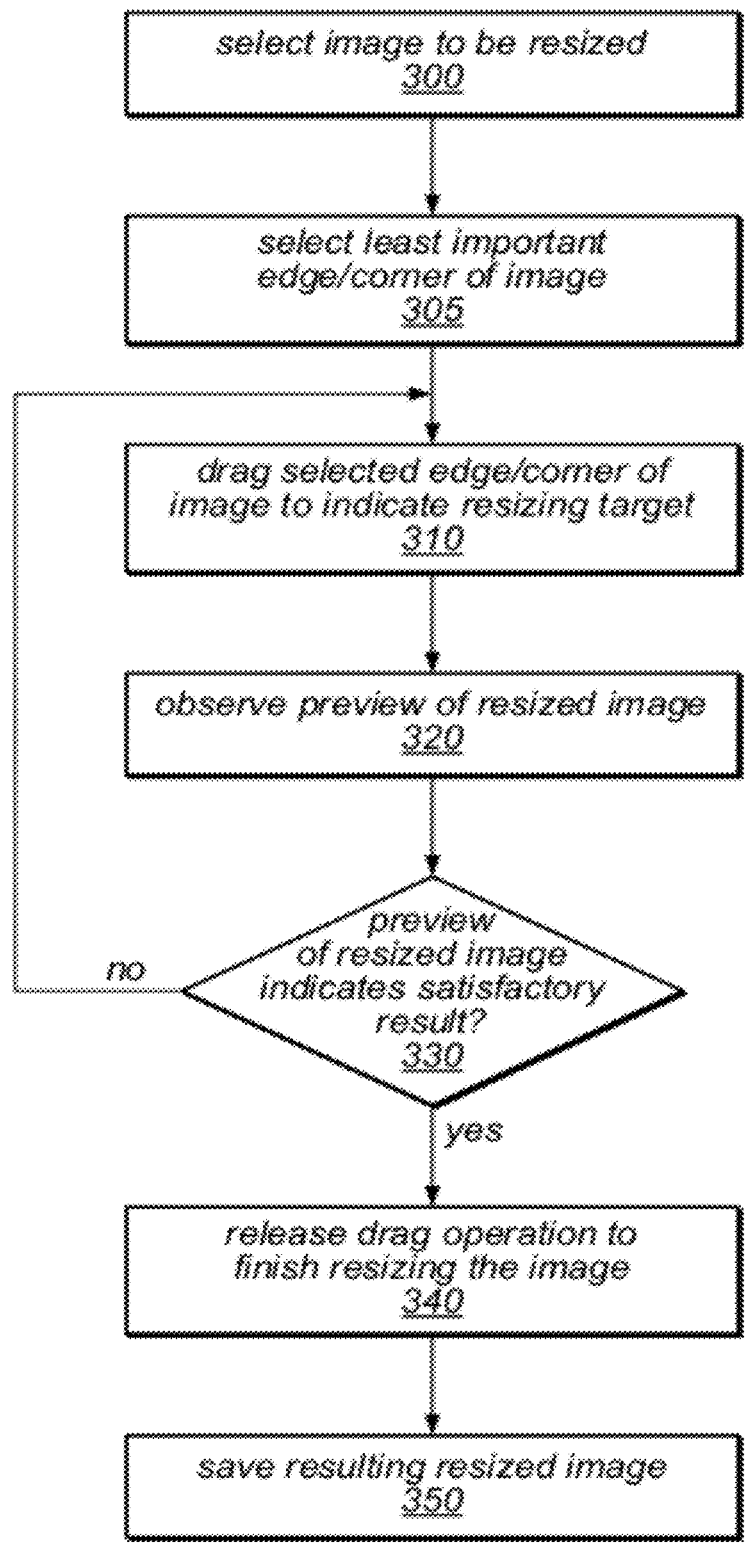
FIG. 3 is a flow chart illustrating a method for applying a resizing operation of an image editing application, according to one embodiment.

One method for applying a content aware hybrid seam cropping or edge weighted seam expansion operation of an image editing application is illustrated in FIG. 3. In this example, a user may select (e.g., using a selection tool of a graphical user interface of the image editing application) an image to be resized, as in 300. To specify the desired content aware resizing operation, the user may select a least important edge or corner of the selected image, as in 305. For example, the user may employ a selection tool of the graphical user interface to select an edge or corner while pressing a modifier key or subsequent to selecting a content aware resizing operation from an editing menu of the interface, in different embodiments.

In the example illustrated in FIG. 3, the user may drag the selected edge or corner of the image to indicate the target size and/or aspect ratio for the resizing operation. For example, the user may drag one of the left, right, top, or bottom edges, or the top left, bottom left, top right, or bottom right corners using horizontal, vertical or diagonal arrows, while a modifier key is pressed (indicating an edge/corner weighted operation) and the application is in a content aware resizing mode. In some embodiments employing such a modifier key, if the modifier key is not pressed, a seam carving technique that does not depend on an edge- or corner-weighting may be applied, and may include a combination of one or more other extensions and/or optimizations. In other embodiments, the image editing application may include a separate content aware crop mode. In such embodiments, the user may not need to press a modifier key, but may simply drag an edge or corner in one of the eight possible ways described above.

As illustrated in FIG. 3, in some embodiments, the user may be presented with a preview of the resized image while the user drags the selected edge or corner, as in 320. In such embodiments, the preview image presented to the user may represent an approximate resizing result achieved in real time, which may be subsequently refined to produce a better result. For example, the preview image may represent the result of the application of the resizing operation using pyramidal retargeting in real time, and the refined image may represent the result of a complete retargeting operation performed when the drag operation is released (i.e. on "drag-Stop"). The use of pyramidal retargeting is described in more detail below (e.g., in reference to FIG. 16). If the preview of the resized image indicates that the result of the resizing operation will yield a satisfactory output image, shown as the positive exit from 330, the user may release the drag operation to finish resizing the image, as in 340. If not, shown as the negative exit from 330, the user may continue to drag the selected edge or corner around until a satisfactory result is indicated by a preview image. This is shown in FIG. 3 as the feedback loop from 330 to 310 and a repeat of the operations in 310-330. Once the resizing operation is complete, the user may save the resulting resized image, as in 350.

In various embodiments, seam carving/expansion operations may be thought of as performing two main steps: pre-processing and retargeting. Pre-processing may involve one or more of: performing energy calculations for an input image, performing dynamic programming on the energy values, searching for the optimal (i.e. lowest-cost) seam(s) via backtracking, and/or mapping the seam(s). Retargeting may involve performing a resizing operation on the image along one or more low cost seams, thus retargeting the image for display using a different size and/or aspect ratio. For example, the resizing operation may be a reduction (carving) operation, and the pixels of the identified seam(s) may be removed. In another example, the resizing operation may be an expansion operation, and the pixels of the identified seam(s) may be replicated in the output image. In some embodiments, a retargeting operation may be invoked by a user by stretching or moving an edge or corner of the image via a graphical user interface. In some embodiments, a retargeting operation may access a pre-computed retargeting matrix (e.g., one that associates each pixel of the input image with a corresponding cost-ordered horizontal and/or vertical seam of which the pixel is a part, and that may be generated during a pre-processing operation) to determine one or more seams to be removed and/or replicated without having to iteratively determine the next lowest cost seam(s) as the image is modified. In some embodiments, a retargeting matrix may be generated in response to opening or accessing an input image in a graphics application, or in response to a request to resize an input image.

Hybrid seam cropping with edge weighted priority may involve multiplying the energy at any given point (found in the first pre-processing step described above) by a factor such that the seams close to the dragged edge or corner are given higher priority for being carved or expanded. In other words, the weighting factor may result in the virtual energy of seams close to the dragged edge or corner being decreased, and the chances of these seams being selected for being carved being increase. One such weighting mechanism may be represented as a linear weighting function, as shown below:

for all $i$ rows and $j$ columns:
$$E(i, j) = E(i, j) \cdot (1 - C_h \cdot j/n) \text{ when cropping is applied from right}$$
$$= E(i, j) \cdot (C_h \cdot j/n) \text{ when cropping is applied from left}$$

In this example, n may represent the number of columns in the portion of the image on which hybrid seam cropping is being applied. The horizontal cropping factor $C_h$ (where $0 \leq C_h \leq 1$) is the cropping ratio to be used in the operation. This ratio may in some embodiments be exposed and made configurable via an input mechanism of a graphical user interface (e.g., a slider bar of the interface may be provided by which the user may set the value). In one example, a $C_h$ of 0.5 may represent a 50% cropping ratio. Similarly, the system may support a configurable vertical cropping factor ($C_v$) for scaling in vertical directions. Alternately, the same cropping factor may be used for both horizontal and vertical scaling. In some embodiments, hybrid seam cropping operations may be dependent on a vertical and/or horizontal cropping factor graph. Such a graph may be linear by default, and/or may be configurable to conform to any curve. For example, in some embodiments, using a cropping graph having a "V" shape or a parabolic shape may allow the system to crop from both sides or both ends of an image or image region without having to perform two separate cropping operations (i.e. one from the left and another from the right, or one from the top and another from the bottom). In some embodiments, the system described herein may support the creation of arbitrary cropping graphs through a graphical user interface, and/or may allow a user to choose from a given set of standard and/or custom cropping graphs through such a graphical user interface. Note that, in some embodiments, a cropping graph preference or selection may be stored and may not need to be set for each scaling operation, but only once within an editing session or for a given application. The values from an applied cropping graph may determine the weights assigned to each pixel of an input image. In some embodiments, the system may support the selection of a special case graph created using the existing energies in the image. This graph may be considered special in the sense that it may change based on the image, and may have to be computed each time the image changes. For example, a horizontal graph of this type may be created such that for each column, the average of the energies of each pixel in that column is calculated and plotted. In other words, the graph may depict the column-wise energy averages for the image. This curve (i.e. a Bézier spline curve) may then be modified to apply emphasis (i.e. more weight) to portions of the image selected by the user. A similar approach may be applied for a vertical graph of this type. Apart from this energy calculation step, the rest of the pre-processing steps listed above may be substantially the same for a hybrid seam cropping operation as for a standard seam carving/expansion operation.

Figure 4:
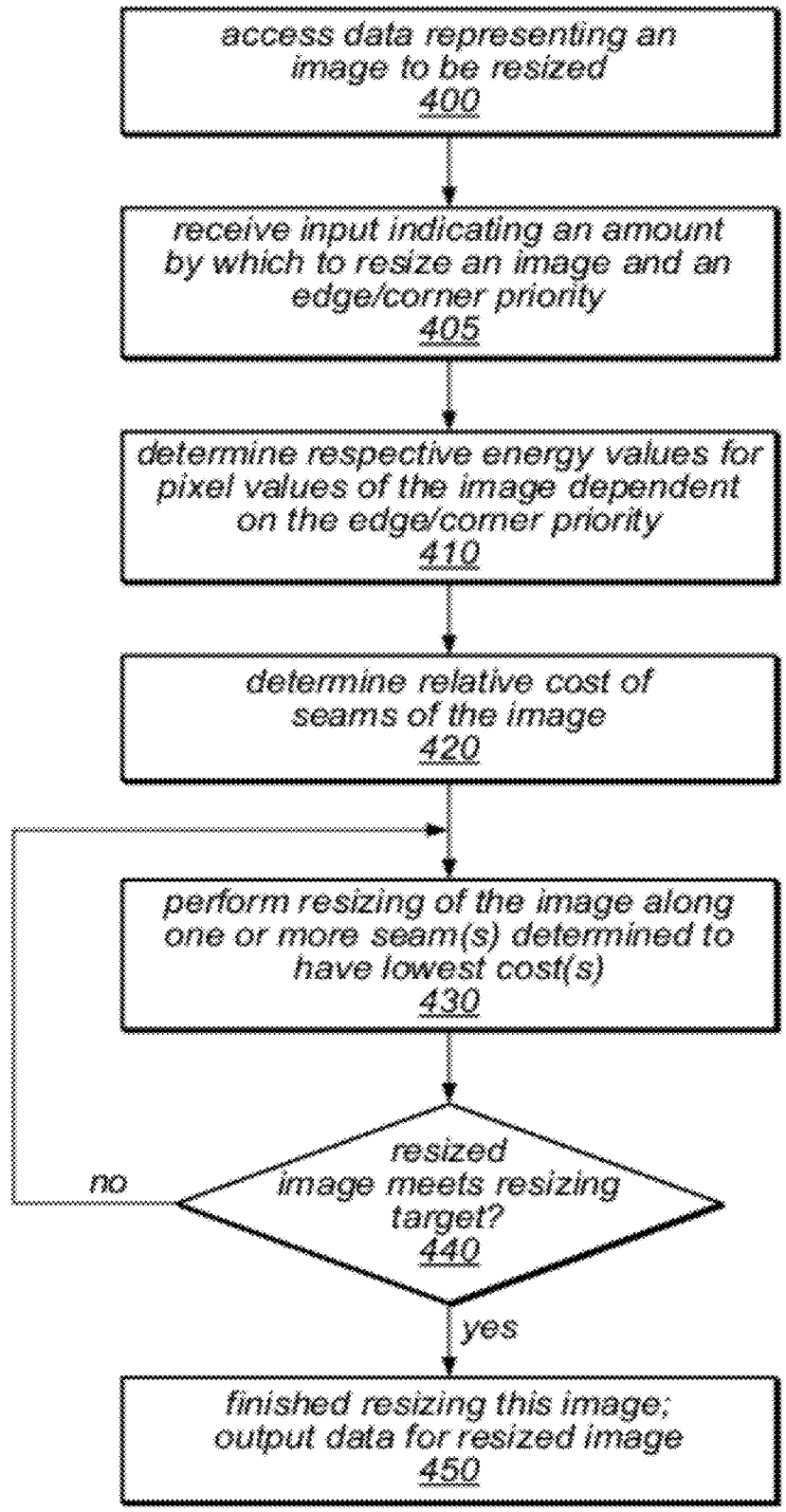
FIG. 4 is a flow chart illustrating a method for content aware hybrid seam cropping and seam carving of images dependent on an edge or corner priority, according to one embodiment.

One embodiment of a method for content aware hybrid seam cropping and seam carving of images dependent on an edge or corner priority is illustrated by the flow chart in FIG. 4. In this example, as in the method illustrated in FIG. 2, the method may include accessing data representing an image to be resized, as in 400. This data may be accessed in response to being imported into an image editing application, or may be resident in memory accessible to such an application as a result of being imported previously, or as a result of being created and/or modified by the application prior to the current resizing operation. In this example, the method includes receiving input indicating an amount by which the image is to be resized and an edge or corner priority, as in 405. As described above, this input may be received through one or more tools of a graphical user interface of the image editing application, such as by selecting and then dragging one of the edges or corners of the image. In other embodiments, the edge or corner priority may be specified by the application and/or selection of a cropping graph.

In this example, the method includes determining respective energy values for the pixel values of the image dependent on the selected edge or corner, as in 410. For example, in some embodiments, the selection of the particular edge or corner that is dragged in the resizing operation may indicate that the corresponding side or corner portion of the image is considered the least important part of the image. Therefore, a weighting function may be applied to the image such that the weight applied to each pixel is dependent on its distance from the selected low-priority edge or corner, as described above. The energy values for the pixels of the image may then be determined (e.g., using a mapping function, cropping graph, look-up table, or other mechanisms) dependent on the edge- or corner-based weighting applied to the pixels. In some embodiments, the energy values may be determined based on derived values of these weighted pixel values (e.g., an average, maximum, sum or difference of the weighted values of a pixel and its neighbors).

In the example illustrated in FIG. 4, the method may continue much as the method illustrated in FIG. 2. It may include determining the relative costs of one or more seams of the image (as in 420) dependent on the determined energy values, performing resizing of the image along one or more seam(s) determined to be of lowest cost (as in 430), and performing additional resizing operations (e.g., on each successive next lowest cost seam) if the resizing target for the image is not met (as in 440 and the feedback to 430). Once the image has been resized to the target size, shown as the positive exit from 440, the resizing operation may be completed and data representing the resized image may be output, as in 450. The resized image may be displayed to the user and/or the output data may be stored for further processing or for other purposes, in different embodiments. Note that, as in the example illustrated in FIG. 2, the method illustrated in FIG. 4 may in various embodiments be applied to reduction of an image, expansion of an image, or a combination of reduction and expansion operations in order to resize the image to its target size and/or aspect ratio (as in FIGS. 1A-1B). For example, in an edge weighted seam expansion operation, if the user drags an image to be expanded from a given corner or edge, the method may replicate more seams close to that corner or edge than seams farther away from that corner or edge as a result of assigning a higher priority (i.e. a lower weighting) to those closer seams. As with hybrid seam cropping operations, the priorities (i.e. weighting) applied to each pixel or column/row of pixels may be dependent on an expansion graph. In some embodiments, the expansion graph may be the same as the cropping graph for a given image, resizing operation, image editing session, or image editing application. Note also that, as described in reference to FIG. 3, the method illustrated in FIG. 4 may be applied iteratively, and may generate one or more previews of a resized image (e.g., at 450) while a user continues to drag a selected edge or corner and observe these previews before finishing the resizing operation.

The hybrid seam cropping techniques described herein may allow a user to perform controlled cropping, e.g., cropping an image while retaining portions of the image which may otherwise have been cropped out of the image. These techniques may in various embodiments be used to retain important content, reposition important content, center image content, and/or maintain an aspect ratio of one or more image objects, as shown in the examples described below.

Content aware hybrid cropping and edge weighted seam expansion of images using edge- or corner-weighted priority may be further described by way of the examples illustrated in FIGS. 5A-5D, 6A-6D, 7A-7D, and 8A-8D. In each of these examples, the input image is hybrid seam cropped from the right. However, the hybrid seam cropping techniques described herein may also be applied from the left, top, or bottom edge, or from a combination of two edges (e.g., from a corner), dependent on the input image and the portion of the image that the user deems least important.

FIGS. 5A-5D illustrate a resizing operation in which important content is retained, according to one embodiment. In this example, the input image is depicted in FIG. 5A. Here, the L-shaped rock is the primary focus of the image. Therefore, to resize the image in width from 400 to 200 pixels by standard cropping, it would make sense to crop 200 columns of pixels from the right edge of the image. However, this would result in losing all of the image content for the rocks in the upper right portion of the image. A standard seam carving operation would retain some of this content, but would result in losing some of the content for the L-shaped rock. The results of a standard seam carving operation are shown in FIG. 5B.

The use of the techniques described herein involving edge-weighted hybrid seam cropping may result in retaining at least a portion of the rocks on the right, while largely preserving the width of the L-shaped rock. FIG. 5C illustrates the results of applying the edge-weighted hybrid seam cropping techniques from the right side of the image with a horizontal cropping factor of 0.5, and FIG. 5D illustrates the results of applying these techniques with a horizontal cropping factor of 0.8. To generate these images, the user may have selected the right edge of the input image, and dragged it to the left a distance equivalent to 200 pixels, while a content aware hybrid seam cropping operation was selected. In both of these images, the width of the L-shaped rock is largely retained.

However, in FIG. 5C less of the L-shaped rock and more of the rocks on the right are retained, while in FIG. 5D, more of the L-shaped rock and less of the rocks on the right are retained. This example illustrates that the user may control the hybrid seam cropping results by manipulation of the configurable horizontal cropping factor.

FIGS. 6A-6D illustrate an example of a resizing operation in which important content is repositioned, according to one embodiment. In this example, the input image is depicted in FIG. 6A and this image is to be reduced in width from 530 to 330 pixels. In this example, the user may wish to resize the image in such a way that the important content is repositioned following the resizing operation. The results of a standard seam carving operation are illustrated in FIG. 6B. This operation results in an image that is the desired target size and that retains the important content (i.e. the three cows). However, the use of the techniques described herein involving edge-weighted hybrid seam cropping may allow the user to affect the positions of the cows in the output image. FIG. 6C illustrates the results of applying the edge-weighted hybrid seam cropping techniques from the right side of the image with a horizontal cropping factor of 0.25, and FIG. 6D illustrates the results of applying these techniques with a horizontal cropping factor of 0.5. To generate these images, the user may have selected the right edge of the input image, and dragged it to the left a distance equivalent to 200 pixels, while a content aware hybrid seam cropping operation was selected. As shown in these figures, the techniques described herein for content aware hybrid seam cropping may be used to orient the cows at different positions in the output image by manipulating the configurable horizontal cropping factor.

Figure 7B:
FIGS. 7A-7D illustrate an example of a resizing operation in which image content is centered, according to one embodiment.
Figure 7D:
Figure 7A:
Figure 7C:

FIGS. 7A-7D illustrate an example of a resizing operation in which image content is centered, according to one embodiment. In this example, the input image is depicted in FIG. 7A and this image is to be reduced in width from 530 to 380 pixels. In this example, the user may wish to resize the image in such a way that the important content is centered in the output image following the resizing operation. The results of a standard seam carving operation are illustrated in FIG. 7B. This operation results in an image that is the desired target size and that retains the important content (i.e. the two hikers). However, the use of the techniques described herein involving edge-weighted hybrid seam cropping may allow the user to affect the positions of the hikers in the output image. FIG. 7C illustrates the results of applying the edge-weighted hybrid seam cropping techniques from the right side of the image with a horizontal cropping factor of 0.25, and FIG. 7D illustrates the results of applying these techniques with a horizontal cropping factor of 0.5. To generate these images, the user may have selected the right edge of the input image, and dragged it to the left a distance equivalent to 150 pixels, while a content aware hybrid seam cropping operation was selected. As shown in these figures, the techniques described herein for content aware hybrid seam cropping may be used to orient the hikers at different positions in the output image (e.g., to center them in the image) by manipulating the configurable horizontal cropping factor. This example illustrates that while content aware hybrid seam cropping may remove seams from all over an image, it may allow the user to remove more seams from one side than from the other in order to center important image content.

Figure 8B:
FIGS. 8A-8D illustrate an example of a resizing operation in which an object aspect ration is largely maintained, according to one embodiment.
Figure 8D:
Figure 8A:

FIGS. 8A-8D illustrate an example of a resizing operation in which an object aspect ration is largely maintained, according to one embodiment. In this example, the input image is depicted in FIG. 8A and this image is to be reduced in width from 800 to 600 pixels. In this example, the user may wish to resize the image in such a way that the aspect ratio of important image objects are largely retained following the resizing operation. The results of a standard seam carving operation are illustrated in FIG. 8B. This operation results in an image that is the desired target size and that retains the important content (i.e. the tigers and vehicle). However, the standard seam carving technique considered the trees to the extreme right to be more important than the tigers, while the user may be more interested in the tigers. In this example, in FIG. 8B, the tiger on the left has been reduced in width such that the aspect ration of the tiger is unnatural.

Figure 8C:
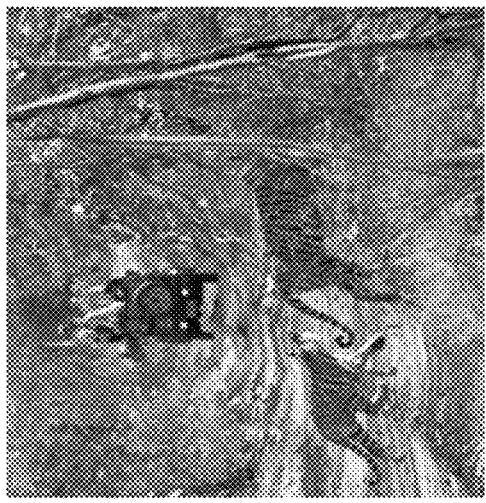

The use of the techniques described herein involving edge-weighted hybrid seam cropping may allow the user to affect the aspect ratios of important image objects in the output image. FIG. 8C illustrates the results of applying the edge-weighted hybrid seam cropping techniques from the right side of the image with a horizontal cropping factor of 0.4, and FIG. 8D illustrates the results of applying these techniques with a horizontal cropping factor of 0.8. To generate these images, the user may have selected the right edge of the input image, and dragged it to the left a distance equivalent to 200 pixels, while a content aware hybrid seam cropping operation was selected. As shown in these figures, the techniques described herein for content aware hybrid seam cropping may be used to largely retain the aspect ratios of one or more image objects in the output image by manipulating the configurable horizontal cropping factor. For example, in FIG. 8D (generated using a higher cropping factor), the trees on the right are still largely preserved, but the tigers and vehicle are more realistic looking than in FIG. 8C (generated using a lower cropping factor). This example illustrates that while content aware hybrid seam cropping may remove seams from all over an image, it may allow the user to remove more seams from one side than from the other in order to at least partially preserve the image ratios of important image objects.

Note that while many of the examples described above involve the horizontal cropping of images, the techniques may also be applied to resizing operations in the vertical dimension. In addition, the techniques described above may also be applied to content aware hybrid seam expansion of images. As previously noted, seam expansion may involve duplicating one or more seams identified as having the lowest cost, starting from the most optimal seam (i.e. the seam having the least energy). Edge- or corner-weighted hybrid seam expansion may apply a weighting function to pixels of an input image in a manner similar to that applied the hybrid seam cropping, and described above. As with hybrid seam cropping, such hybrid seam expansion may employ a configurable expansion tolerance in one or both directions or an expansion graph, in various embodiments.

Note that in some embodiments, the selection of the hybrid cropping ratio may affect the amount and/or location of artifacts that may be introduced by a hybrid seam cropping operation. For example, as the hybrid crop ratio increases, in some cases, more artifacts may increase on the side of the image from which the hybrid seam cropping operation is being applied. This is because the hybrid seam cropping operation may be picking up what would be higher energy seams because they are close to the cropping edge. Therefore, in some embodiments, the method may produce better results if the cropping ratios are kept to lower values (e.g., <0.5), in such cases. However, this phenomenon may only be exhibited for hybrid seam cropping operations performed on particular images and/or in particular cropping directions. For instance, in two of the examples above, the cropping ratio is relatively high (0.8), but the output is satisfactory.

In some embodiments, the hybrid seam cropping techniques described herein may be applied to the in place up scaling of a selected portion of an image, and may allow such scaling to be performed while preserving the context. In such embodiments, the user may select a portion of an image to be up scaled via any suitable means (e.g., a quick selection, magic wand, magnetic lasso, marquee tool, or bitmap brush of a graphical user interface). Rather than requiring the user to make exact selections and/or cutouts of image objects to be up scaled (which may require very high precision and experience), the methods described herein may allow such up scaling to be performed using an approximate selection of the bounds of the image object (e.g., by creating a simple rectangle), which may be much easier to make. When scaling a selection up, there may be two other portions of the image that need to be processed differently:

A portion of the image in which the up scaled selection 'overlaps' the original selection A portion of the image in which the up scaled selection is 'outside' (i.e. is not overlapping) the original selection If the selected portion of the image is up scaled using a standard interpolation technique (e.g., bi-cubic interpolation or any other standard interpolation technique) and then patched in place over the original selection, this may result in occlusion of some other important object or portion of the image, which is undesirable. In addition, if an attempt is made to perform in place up scaling using patching of an up scaled bounding box, apart from occlusion, there may also be mismatches between image content at the boundaries of the bounding box. If an attempt is made to use standard seam carving and seam expansion on different parts of the image in a one pass workflow (e.g., in a 2D scale scenario), this may result in a situation in which two or more voids are created and which will have to be filled, depending on how the parts are chosen. As described in more detail below, the content aware hybrid seam cropping techniques described herein may be applied to in place up scaling operations, and may allow these operations to be performed with satisfactory results.

In some embodiments, to invoke content aware in place up scaling, a user may simply need to select the approximate bounding box of the selection to be up scaled, and drag it by the desired scale factor while a resizing tool is active. Based on the bounding box, the image may be broken into three portions in one dimension (e.g., left, right, and center portions for an up scaling operation in the horizontal dimension). The center portion may be seam expanded and the two other portions may be hybrid seam cropped in the direction of expansion due to the up scaling operation. The amount of seam cropping to be applied (e.g., the number of seams to be removed) may be determined by the bounding box and the scale factor, and the distribution of the seam cropping (e.g., the relative number of seams to be removed from each of the side portions) may be determined based on a registration point and/or on the relative size of each side portion. If the up scaling operation is a scaling operation in only one dimension, the output of the operation may be generated by combining the center portion and the retargeted side portions, displacing them according to the target size and position of the up scaled center portion, and then patching a displaced, scaled (e.g., interpolated) version of the bounding box content in place of the center portion.

In some embodiments, the output of a one-dimensional in place up scaling operation may be thought of as an intermediate output of a two-dimensional in place up scaling operation. In such embodiments, this intermediate output may be treated as a fresh input to an in place scaling operation in the other dimension. The intermediate output may be broken into three new portions in the other dimension, e.g., in the vertical dimension, in this example. The center portion may be seam expanded in the vertical direction, in a seam expansion operation similar to that described above. The other two portions may be hybrid seam cropped, and the three portions may be concatenated, as described above. In this example, the new bounding box from the intermediate output may be scaled (e.g., using interpolation) and patched into the concatenation image after displacement of the other two portions to generate the final output image. In some embodiments, the patching operation may be skipped when generating an intermediate output (i.e. the output of a one-dimensional resizing operation to be input to the second pass of a two-dimensional resizing operation) such that it is performed only once for the two-dimensional resizing operation (e.g., following the resizing operation in the second dimension).

Note that, as used herein, the term "registration point", when used in the context of a scaling operation, may refer to the point that does not change location when a selection or image portion is scaled. For example, if performing a scaling operation with a "top left" registration point, the portion of the image that was selected for in place up scaling may be positioned in the output image such that the position of the top left corner of the selection in the input image and the top left corner of the up scaled selection in the output image coincide. Similarly, if a center registration point is specified for an in place scaling operation, the methods described herein may result in the selected image portion moving in two or four directions for 1D and 2D scaling, respectively.

Figure 9:
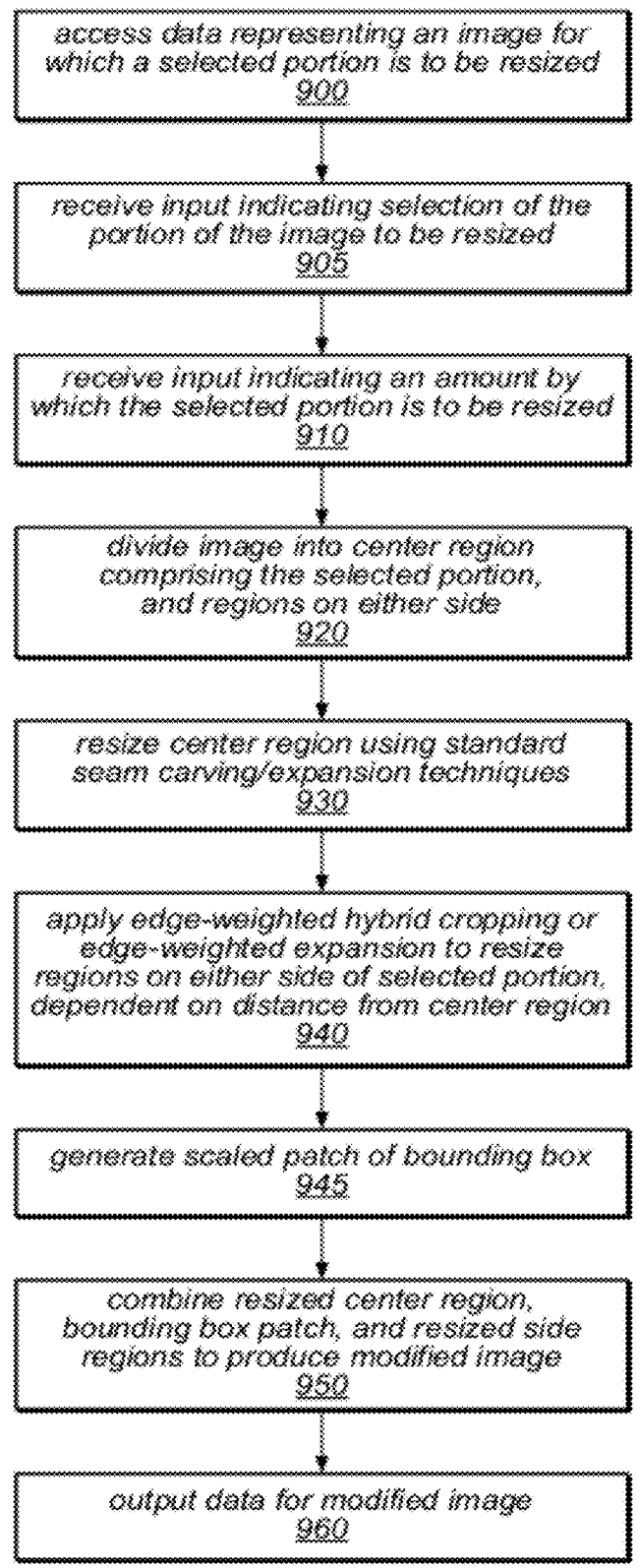
FIG. 9 is a flow chart illustrating a method for resizing a portion of an image, using content aware hybrid seam cropping or edge weighted seam expansion, according to one embodiment.

FIG. 9 is a flow chart illustrating a method for resizing a portion of an image, using content aware hybrid seam cropping or edge weighted seam expansion, according to one embodiment. In this example, as in the method illustrated in FIG. 2, the method may include accessing data representing an image for which a selected portion (e.g., an image object) is to be resized, as in 900. This data may be accessed in response to being imported into an image editing application, or may be resident in memory accessible to such an application as a result of being imported previously, or as a result of being created and/or modified by the application prior to the current resizing operation. In this example, the method may include receiving input indicating the selection of the portion of the image to be resized, as in 905. For example, in various embodiments, a user may select an image object to be resized by defining a bounding box roughly enclosing the image object using a selection tool of a graphical user interface of an image editing application.

In the example illustrated in FIG. 9, the method includes receiving input indicating an amount by which the selected portion of the image is to be resized, as in 910. As described above, this input may be received through one or more tools of a graphical user interface of the image editing application, such as by selecting and then dragging one of the edges or corners of the bounding box to indicate a target size and/or aspect ratio for the selected image object. In this example, the direction of the dragging input may be used to determine a registration point of the resizing operation (e.g., center, top left corner, bottom edge, etc.) In other embodiments, a horizontal and/or vertical scaling factor may be specified using another mechanism, such as an alphanumeric entry field of a graphical user interface.

In this example, the method illustrated in FIG. 9 may be applied in one dimension at a time. As illustrated in FIG. 9, the method may include dividing the image into three regions in the dimension of the resizing operation, as in 920. For example, if the selected portion is to be scaled up in the horizontal dimension by a factor of $S_x$ with a center registration point, the input image may be divided into three vertical strips. The three vertical strips may be defined by vertical lines containing the left and right bounds of the approximate bounding box of the selected portion of the image. Thus, one of the vertical strips includes the portion of the image to the left of the selected portion, one (the center strip) includes the selected portion of the image, and one includes the portion of the image to the right of the selected portion.

In this example, the method may include resizing the region containing the selected portion of the image (i.e. the center vertical strip) in the horizontal dimension to increase its width by the factor Sx, as in 930. In various embodiments, the center vertical strip may be resized using a standard seam expansion technique. Resizing the entire center strip using standard seam expansion may yield results that feel as if only the bounding box and not the entire strip has been expanded, since seam expansion may ensure that only unimportant content of the strip (e.g., sand, water, sky, etc.) is expanded.

In order to have enough space in the output image for the resized center strip, the method may include resizing the other two vertical strips of the image by applying edge-weighted hybrid seam cropping to these vertical strips, where the weighting applied to each pixel (or row/column of pixels) is dependent on its distance from the center strip, as in 940. Note that, in some embodiments, the weighting applied to each pixel may be dependent on a cropping graph instead of, or in addition to, its distance from the center strip. In some embodiments, a scaled version of the bounding box content may be generated, as in 945. As described in more detail herein, this scaled version of the bounding box content may be subsequently patched over the portion of the resized center strip defined by the bounding box. Once all three regions have been resized and the bounding box patch has been generated, the method may include producing a modified image in which the selection portion has been resized by combining the resized (in this case, up-scaled) center strip, the scaled bounding box patch, and the resized (in this case, hybrid seam cropped) side strips, as in 950. Data representing the modified image may then be output, as in 960. As in previous examples, the modified image may be displayed to the user and/or the output data may be stored for further processing or for other purposes.

As previously noted, to have enough space in the output image for the resized center strip, the method may include resizing the other two vertical strips of the image by applying edge-weighted hybrid seam cropping to these vertical strips, where the weighting applied to each pixel is dependent on its distance from the center strip, as in 940. For example, the method may include resizing the side strips by a total amount equal to the difference in width of the original bounding box and the width of the resized bounding box, as follows:

diffInWidth=origWidth·($S_x$−1)

If there is a center registration point, as in this example, the horizontally scaled up center portion may take up space that was included in both the left and right strips in the input image. In this example, the method may include applying the techniques described herein for content aware hybrid seam cropping to the vertical strips on either side of the selected portion, such that the edge of each portion adjacent to the center portion corresponds to the selected edge described above. In other words, the method may include applying content aware hybrid seam carving on the left strip from its right side, and on the right strip from its left side, to create space for the center portion to expand. Applying content aware hybrid seam cropping with edge-weighted priority, rather than standard seam carving techniques, may in some embodiments result in more seams being removed from portions of the image that are close to the image portion (or object) selected for resizing than from portions of the image farther from the selection portion/object.

In various embodiments, the method may employ two cropping tolerances or two cropping graphs for each side in each dimension, or may use the same cropping tolerances/graphs for both sides and/or both dimensions. In some experiments, a crop tolerance of 0.5 provided good results. This crop tolerance may in some embodiments be used as the default value by the methods described herein. As previously noted, application of the cropping operation may be linear across an image (e.g., based on one or more cropping factors and/or cropping graphs). In various embodiments, two cropping graphs may be applied that are mirror images of each other, or that are completely different. For example, in some embodiments, there may be two cropping graphs for one-dimensional resizing operations, four cropping graphs for two-dimensional resizing operations, and so on. If only one cropping graph is specified for a two-dimensional resizing operation, a second cropping graph may be generated and/or applied representing a mirror image of the specified graph about its center, a third cropping graph may be generated and/or applied representing the specified cropping graph rotated by 90°, and a forth cropping graph may be generated and/or applied representing a mirror image of the third cropping graph about its center.

In the case of an up scaling operation with a registration point at the center, if hybrid seam cropping is applied in both directions by equal amounts (e.g., by diffInWidth/2), the result may include artifacts. However, if the selection to be scaled is close to one edge, there may not be enough pixels in one of the side portions to seam crop it without creating artifacts. Therefore, in some embodiments, a method for performing hybrid seam cropping may seam crop each portion by an amount proportionate to the width of the portion, as in the following example:

C1=w1/(w1+w2)

C2=w2/(w1+w2)

In this example, w1 and w2 represent the widths of the two side portions, respectively. Note that in this example, the relative amount by which each side portion is seam cropped is not dependent on the width of center portion. Thus, in this example, the image is seam cropped by C1·diffInWidth in the side portion having width w1 and by C2·diffInWidth in the side portion having width w2. For an up scaling operation having a left edge registration, (i.e., with the left edge constrained), the left side portion may not be seam cropped at all, and the right portion may be seam cropped by diffInWidth. The relative amounts by which the side portions of an image should be seam cropped in an in place up scaling operation may be computed for all nine registration points described herein in a manner similar to the two examples above.

Due to the limitations of seam expansion, a content aware in place up scaling operation may, in some cases, produce artifacts in the output image. Since the scaled portion is the area of focus for the up scaling operation, artifacts in this portion of the image are particularly undesirable. Therefore, in some embodiments, the content aware in place scaling operation may include a patching operation as the final step. In some embodiments, patching may involve scaling (e.g., using interpolation) the contents of approximate bounding box (input) of the selection by $S_x$, and placing this scaled result over the seam expanded center portion such that the scaled bounding box in the seam expanded portion coincides with the scaled bounding box of the scaled selection.

Figure 10A:
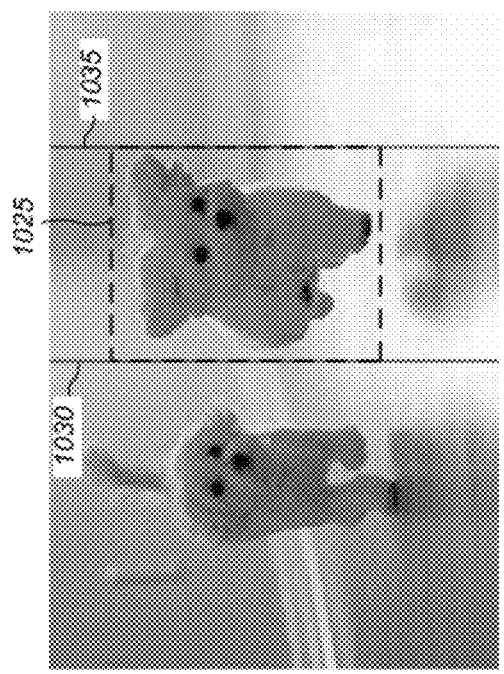
FIGS. 10A-10D illustrate an example of a resizing operation in which an image object is up-scaled, according to one embodiment.

FIGS. 10A-10D illustrate an example of a resizing operation in which an image object is up-scaled, according to one embodiment. In this example, the input image is depicted in FIG. 10A. As illustrated in FIG. 10A, an approximate bounding box 1020 has been defined that surrounds the dog on the right side of the input image. In this example, the selected dog is to be scaled up by a factor of 1.5 in the horizontal dimension, and the crop tolerance is set to 0.5. In this example, a linear cropping graph using this crop tolerance is to be applied to the resizing operation.

Figure 10B:
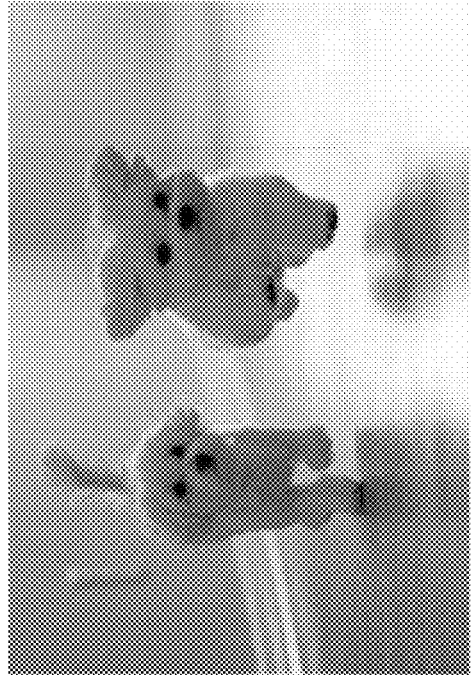

Preliminary results of the application of the in place up scaling techniques described herein are illustrated in FIG. 10B. In this example, the image contents within the bounding box 1020, along with the portions of the image above and below the bounding box in a vertical strip having the width of the bounding box, have been seam expanded in the horizontal dimension by the scaling factor of 1.5. The seam expanded vertical strip is shown as the portion of the image between vertical lines 1030 and 1035 in FIG. 10B, and the resized image object (the resized selected dog) is shown within this seam expanded vertical strip, as outlined by the (now expanded) bounding box 1025. In this example, a hybrid seam cropping operation was applied to the portion of the image to the left of vertical line 1030 and to the portion of the image to the right of vertical line 1035. In this example, generating the preliminary results illustrated in FIG. 10B did not include performing a patching operation, as described above. Note that because the method includes applying seam expansion to the entire vertical strip containing the bounding box (i.e. the vertical strip between 1030 and 1035), the reflection of the selected dog has also been scaled by the seam expansion operation, even though it was not explicitly selected.

Figure 10C:
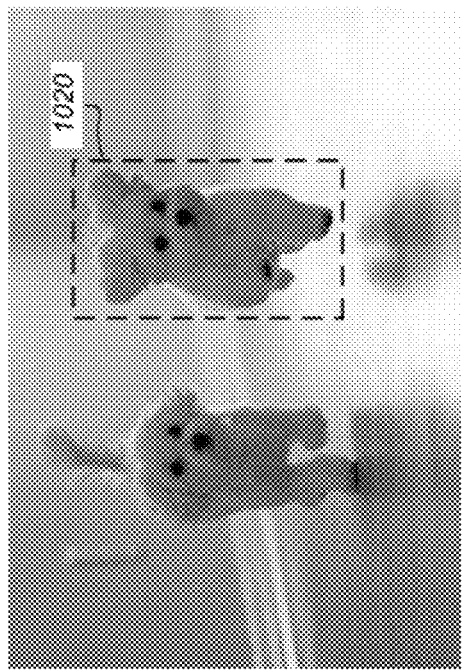
Figure 10D:
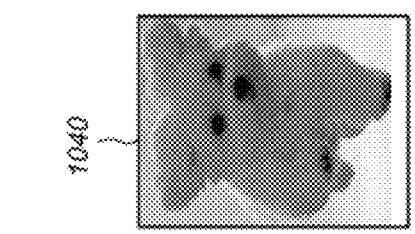

FIGS. 10C and 10D illustrate the application of the additional patching step described herein to produce the final result. In this example, FIG. 10C illustrates the result of an interpolated scaling operation on the contents of bounding box 1020 by 1.5 times. This is shown as the contents of scaled bounding box 1040. When the contents of seam expanded bounding box 1025 of FIG. 10B are replaced with the contents of scaled bounding box 1040 in a patching operation, the result is the image illustrated in FIG. 10D.

In some embodiments, to generate images 10B-10D, the user may have selected the right edge of bounding box 1020, and dragged it to the right a distance equivalent to one-half the width of bounding box 1020, while a content aware hybrid seam cropping operation was selected. In other embodiments, the user may have entered a horizontal scaling factor of 1.5 in an alphanumeric field of a graphical user interface and/or may have specified a center, left, or right registration point for up scaling of the selected image object.

Figure 11A:
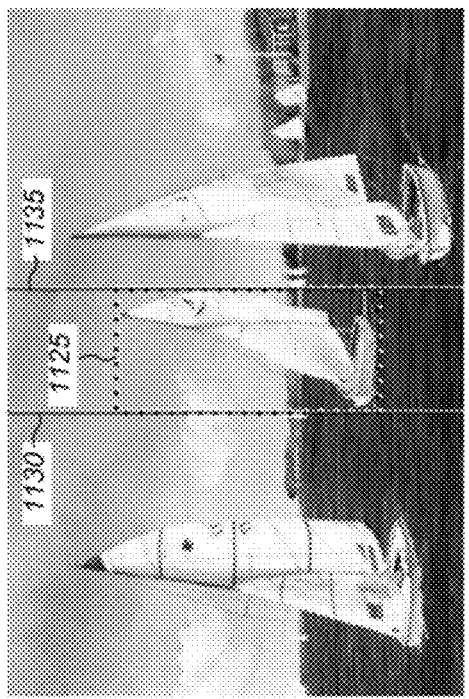
FIGS. 11A-11D illustrate another example of a resizing operation in which an image object is up-scaled, according to one embodiment.
Figure 11B:
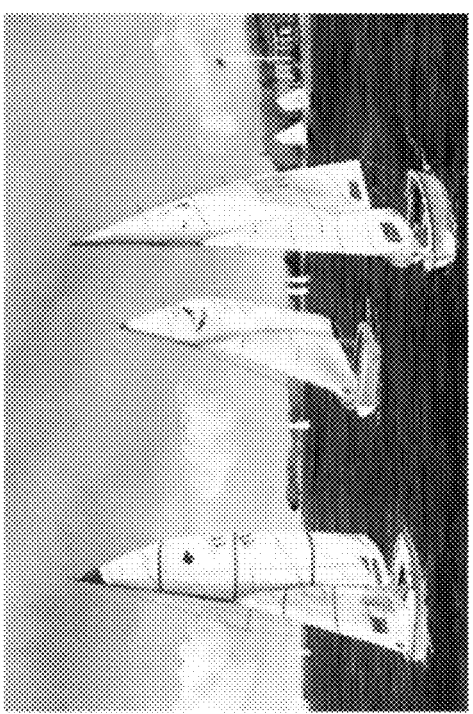

FIGS. 11A-11D illustrate another example of a resizing operation in which an image object is up-scaled, according to one embodiment. In this example, the input image is depicted in FIG. 11A. As illustrated in FIG. 11A, an approximate bounding box 1120 has been defined that surrounds the boat near the center of the input image. In this example, the selected boat is to be scaled up by a factor of 1.7 in the horizontal dimension. Preliminary results of the application of the in place up scaling techniques described herein are illustrated in FIG. 11B. In this example, the image contents within the bounding box, along with the portions of the image above and below the bounding box in a vertical strip having the width of the bounding box, have been seam expanded in the horizontal dimension by the scaling factor of 1.7. The seam expanded vertical strip is shown as the portion of the image between vertical lines 1130 and 1135 in FIG. 11B, and the seam expanded image object (the resized selected boat) is shown within this seam expanded vertical strip, as outline by the (now expanded) bounding box 1125. In this example, a hybrid seam cropping operation was applied to the portion of the image to the left of vertical line 1130 and to the portion of the image to the right of vertical line 1135. In this example, generating the preliminary results illustrated in FIG. 11B did not include performing a patching operation, as described above.

FIG. 11B illustrates a case in which seam expansion has not done a good job on scaling the selected boat. As described above, in various embodiments and for different images, the choice of the scaling factor may have a great effect on the quality of the seam expansion operation. For example, for a scaling factor of $S_x$=2, seam expansion may yield pretty good results, but for a scaling factor of $S_x$=1.7, or $S_x$=1.8, they may not be satisfactory, as in the example above. In such cases, an additional patching step, such as that as described above, may be performed to improve the final result. After patching, the appearance of the scaled selection may be greatly improved, without compromising on the boundaries. The final output demonstrates the benefit of content aware in place scaling. For example, if the selected boat had been up scaled using simple patching of an up scaled selection, the very small boats on both sides of the selected boat would have been obscured, and there would have been artifacts on the boundaries of the simple patch. Note that in this example, the cropping factor was set to 0, so that these very small boats on both sides would be retained in the output image.

Figure 11D:
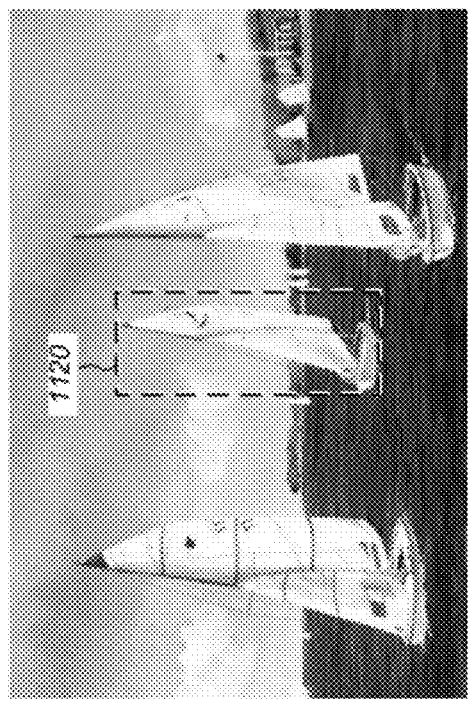
Figure 11C:
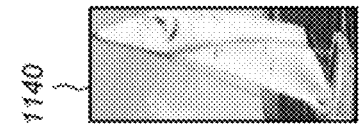

FIGS. 11C and 11D illustrate the application of the additional patching step described herein to produce the final result. In this example, FIG. 11C illustrates the result of an interpolated scaling operation on the contents of bounding box 1120 by 1.7 times. This is shown as the contents of scaled bounding box 1140. When the contents of seam expanded bounding box 1125 of FIG. 11B are replaced with the contents of scaled bounding box 1140 in a patching operation, the result is the image illustrated in FIG. 11D.

In some embodiments, to generate images 11B-11D, the user may have selected the right edge of bounding box 1120, and dragged it to the right a distance equivalent to 0.7 times the width of bounding box 1120, while a content aware hybrid seam cropping operation was selected. In other embodiments, the user may have entered a horizontal scaling factor of 1.7 in an alphanumeric field of a graphical user interface and/or may have specified a center, left, or right registration point for up scaling of the selected image object. In this example, notice that the very small boat to the left and the two very small boats to the right of the selected scaled boat are not obscured as a result of this scaling. Note that in this and other examples, the direction of motion may determine the placement and/or size of the rescaled object, but may only partially determine the registration point. For example, in some embodiments, the methods described herein may not be able to distinguish between a center registration point and a left registration point when a selected object is dragged from the right in an in place scaling operation. Therefore, the registration point may have to be specified in some way. In some embodiments, a partial determination of a registration value may be automatically performed or a default registration value may be defined, but the user may be able to override these values. In some imaging applications, a default registration point may be set and/or modified for each instance by indicating a desired registration point on a 3×3 matrix presented to the user.

In some embodiments, content aware hybrid seam cropping methods may be applied to in place downscaling of image objects. With downscaling, instead of overlapping and outside portions being formed (as a result of up scaling), these operations may result in the formation of overlapping portions and void portions (i.e. "holes" in the image), which may need to be filled. Filling these holes through interpolation could result in major artifacts, as the method would need to construct fill content for something that was not present in the input image. Attempts to use seam carving/expansion to fill the holes in a one-pass workflow (e.g., in a 2D scale scenario), may result in a situation similar to that described above for up scaling.

In various embodiments, inputs to an in place downscaling operation may be similar to inputs of an in place up scaling operation. For example, they may include an indication of an image portion or object to be downscaled (e.g., by defining an approximate bounding box for the portion or object), an indication of the amount by which the selection should be scaled, and/or an indication of a registration point for the operation. In various embodiments, a method for performing an in place downscaling operation may include dividing the image into a center portion to be contracted and two side portions to be expanded to fill the voids created by contracting the center portion. The method may include a determination of the amount by which to contract the center portion, a determination of the total amount by which the two side portions should be expanded, and a determination of the relative distribution of this expansion between the two side portions.

Unlike in an up scaling operation where addition space is needed for the center portion, in a downscaling operation, the method may need to fill up space. Therefore, the method may in some embodiments include the application of edge- or corner-weighted seam expansion, rather than content aware hybrid seam cropping in the side portions in both passes. In a downscaling operation, the center portion is to be scaled down instead of up. Therefore, the method may include the application of seam carving, rather than seam expansion, on the center portion. Similarly, the method may make use of expansion tolerances or expansion graphs, rather than the crop tolerances or crop graphs used in an in place up scaling operation. In some embodiments, the method may include a patching step, in which a patch (e.g., a patch generated by applying interpolated scaling to the image selection in the bounding box to scale it down) may be displaced in the output image such that the scaled bounding box content of the patch replaces the bounding box content in the seam carved region (i.e. the center portion). Other than these differences, the steps for performing in place downscaling (in one dimension, in real time, and/or in two dimensions) may be substantially similar to the steps for performing in place up scaling described herein. In some embodiments, by applying content aware hybrid seam expansion to an in place downscaling operation, the holes generated by the down scaling of the selected portion may be filled without distorting important content in the image.

Figure 12A:
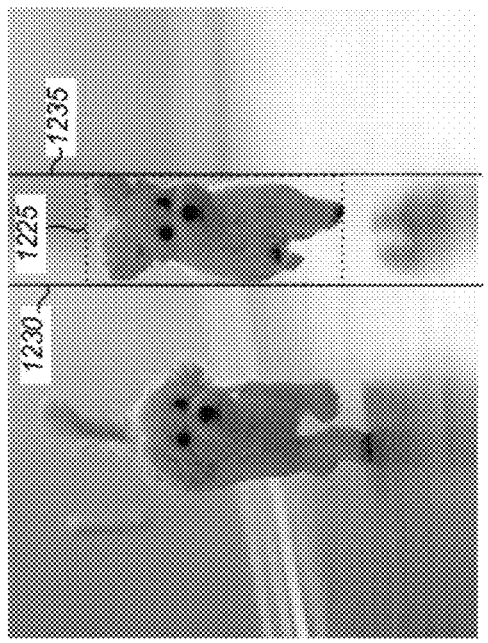
FIGS. 12A-12D illustrate an example of a resizing operation in which an image object is downscaled, according to one embodiment.

FIGS. 12A-12D illustrate an example of a resizing operation in which an image object is downscaled, according to one embodiment. In this example, the input image is depicted in FIG. 12A. As illustrated in FIG. 12A, an approximate bounding box 1220 has been defined that surrounds the dog on the right side of the input image. In this example, the selected dog is to be scaled down by a factor of 0.7 in the horizontal dimension.

Figure 12B:
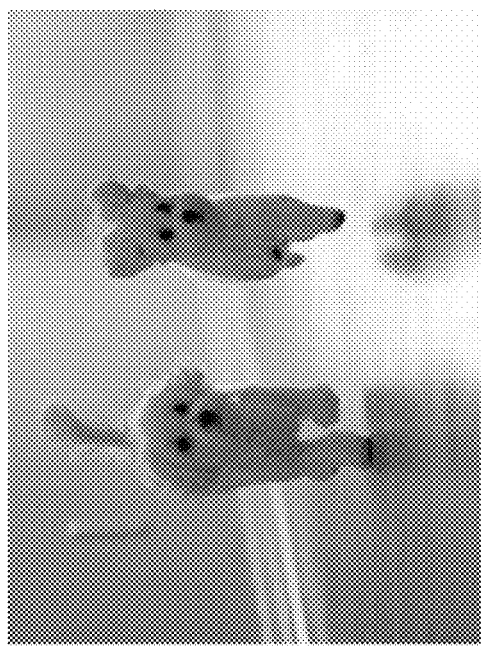

Preliminary results of the application of the in place down scaling techniques described herein are illustrated in FIG. 12B. In this example, the image contents within the bounding box, along with the portions of the image above and below the bounding box in a vertical strip having the width of the bounding box, have been seam carved in the horizontal dimension by the scaling factor of 0.7. The seam carved vertical strip is shown as the portion of the image between vertical lines 1230 and 1235 in FIG. 12B, and the seam carved image object (the resized selected dog) is shown within this seam carved vertical strip, as outlined by the (now carved) bounding box 1225. In this example, an edge weighted seam expansion operation was applied to the portion of the image to the left of vertical line 1230 and to the portion of the image to the right of vertical line 1235. In this example, generating the preliminary results did not include performing a patching operation, as described above. Note that because the method includes applying seam expansion to the entire vertical strip containing the bounding box (i.e. the vertical strip between 1230 and 1235), the reflection of the selected dog has also been scaled, even though it was not explicitly selected.

Figure 12D:
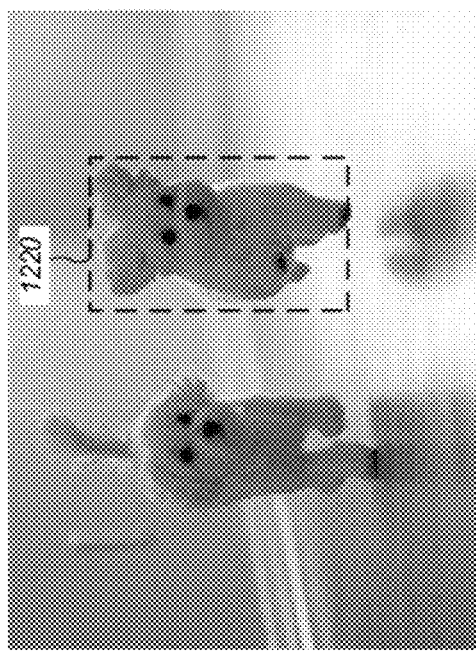
Figure 12C:
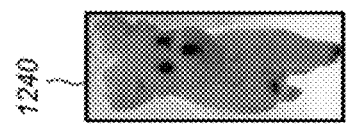

FIGS. 12C and 12D illustrate the application of the additional patching step described herein to produce the final result. In this example, FIG. 12C illustrates a scaled view of the result of an interpolated scaling operation on the contents of bounding box 1220 by 0.7 times. This is shown as the contents of scaled bounding box 1240. When the contents of seam carved bounding box 1225 of FIG. 12B are replaced with the contents of scaled bounding box 1240 in a patching operation, the result is the image illustrated in FIG. 12D.

In some embodiments, to generate images 12B-12D, the user may have selected the right edge of bounding box 1220, and dragged it to the left a distance equivalent to 0.3 times the width of bounding box 1220, while a content aware hybrid seam cropping operation was selected. In other embodiments, the user may have entered a horizontal scaling factor of 0.7 in an alphanumeric field of a graphical user interface and/or may have specified a center, left, or right registration point for up scaling of the selected image object.

The methods described above for in place up scaling and downscaling may produce excellent results, but in some cases may not be fast enough for use in real time interactive editing operations. In some embodiments, the performance of these operations may be accelerated by the pre-processing of the input image and/or the generation of additional representations of the input image. As described above, seam carving/expansion, hybrid seam cropping, and edge weighted seam expansion operations may be thought of as performing two main steps: pre-processing and retargeting. Pre-processing may involve one or more of: performing energy calculations for an input image, performing dynamic programming on the energy values, searching for the optimal (i.e. lowest-cost) seam(s) via backtracking, and/or mapping the seam(s). Retargeting may involve performing a resizing operation on the image along one or more low cost seams (e.g., removing the lowest energy seams one by one), thus retargeting the image for display using a different size and/or aspect ratio.

In some embodiments, in order to achieve real time performance of in place up scaling operations in one dimension, the concept of multi-size images may be applied to the operations. In such embodiments, multiple representations of the input image having footprints of between 1×1 and m×n may be preprocessed and stored for use in the in place scaling operations. The generation and use of such multi-size images are described, for example, in "Seam Carving for Content-Aware Resizing", by Shai Avidan and Ariel Shamir, presented at *ACM SIGGRAPH* 2007 (San Diego, Calif., Aug. 5-9, 2007). For an in place scaling operation, the method may include hybrid seam cropping or edge weighted seam expansion of up to two side portions and seam carving or expansion of one portion of the image. Therefore, rather than pre-processing the entire input image at once, the method may include passing all three portions of the image to the preprocessing procedure for separate processing. In a multi-core processing environment, the pre-processing steps applied to each portion may be performed simultaneously, in some embodiments. In some embodiments, scaling of the bounding box content (e.g., to generate a patch) may be done as part of a pre-processing step. In the retargeting step, the method may take the output of pre-processing step as input and may apply the appropriate modification on each portion according to the pre-processed representations of that portion. Following these modifications, the scaled patch may be applied. In some embodiments, preprocessing of multi-size images may allow the method to perform quick real time in place up scaling, as only the retargeting itself may need to be performed in real time. In such embodiments, the method may be configured to scale the bounding box selection one pixel at a time as the user drags the bounding box in any direction.

While many of the examples described herein involve in place scaling in one dimension (e.g., horizontally or vertically), in general, the methods described herein may be applied to scale an image or image object in two dimensions. In some embodiments, the system may not support in place scaling in two dimensions in real time. For example, the method illustrated in FIG. 9 and described above, may be applied in one dimension first, and then in the other dimension. In such embodiments, the output of the operation performed in one dimension may be used as the input to the operation to be performed in the second dimension. In some embodiments, if the height of the selection divided by the height of the input image is greater than the width of selection divided by the width of input image, the methods may be applied first in the horizontal dimension and then in the vertical dimension; and vice versa. In this example, when the user makes a bounding box selection and drags it to scale it to by some amount, the user may not be shown any real time updates.

In one embodiment, a method for performing in place scaling in two dimensions may include the following steps:
  Divide the input image into three portions in one dimension, as described above.
  Pre-process the three portions (e.g., for up scaling, pre-process for hybrid seam cropping in the side portions in the direction of the scaling and pre-process the center portion for seam expansion). These pre-processing operations may be done independently for each portion using multi-core processors.
  Pre-process the bounding box area (e.g., using interpolated scaling) to generate a new bounding box.
  Retarget the three portions according to the scaling applied to the bounding box area in the first dimension.
  Create an intermediate output by positioning the three retargeted portions as described above.
  Divide this intermediate output into three portions in the other dimension.
  Pre-process the three portions in the other dimension (e.g., for up scaling, pre-process for hybrid seam cropping in the side portions in the direction of the scaling and pre-process the center portion for seam expansion). These pre-processing operations may be done independently for each portion using multi-core processors.
  Pre-process the new bounding box area (e.g., using interpolated scaling).
  Retarget the three portions in the other dimension according to the scaling applied to the bounding box area in the other dimension.
  Create an output by positioning the three portions as described above.
  Render the final output when user input indicates the end of the scaling operation (e.g. on a "mouseUp" or "dragUp"). In some embodiments, there may be a delay while the final output is rendered.

Note that in embodiments in which resizing operations are first performed using pyramidal retargeting (which may be faster than complete retargeting) in real time, complete retargeting may be performed in response to a "mouseUp" or "dragUp" input. Note that in these examples, the bounding box area itself may be different from the center portion (e.g., it may typically be a subset of the center portion, where the center portion is a strip the length or width of the image). Note also that in these examples, the bounding box area in the second pass may be different from the bounding box of first pass, as it has been transformed by the scaling in the first dimension.

To approach real-time performance for in place scaling operations in two dimensions, the techniques involving multi-size images described above for use in one dimension may in some embodiments be applied in two passes, i.e. once in each dimension. In some embodiments, this may require that the user first indicate a desired scaling for the object in one dimension and then indicate a desired scaling for the object in the other dimension, as the user drags the bounding box to scale the selection. In one such embodiment, a user input mechanism (e.g., the mouse) may be restricted to being dragged in one direction at a time. For example, if the user attempts to drag the mouse at any angle less than 45° to the horizontal, the mouse may move horizontally. Otherwise, it may move vertically. In a second drag operation (e.g., following a "mouseUp"), the user may be able to change the angle. In one embodiment, a sample workflow may be as follows: the user drags the bounding box a small distance in a direction closer to horizontal than to vertical, mouses up, drags the bounding box a small distance in a direction closer to vertical than to horizontal, mouses up, drags the bounding box an additional distance in a direction closer to vertical than to horizontal, mouses up, and so on.

In some embodiments, a method for performing two-dimensional in place scaling operations at near real-time speeds may include two complete phases (each of which may include pre-processing and retargeting steps, as described herein). The first pre-processing phase may be triggered when the selection of the bounding box is completed. In the preprocessing step, based on an initial restricted direction of motion, the method may include applying pre-processing on four portions (e.g., a left strip, right strip, vertically oriented center strip, and the bounding box) as soon as the selection is made. In such embodiments, the bounding box may be scaled using an interpolated scaling technique. The other three portions may be retargeted in real time as the user drags the selection restrictedly in one direction. The first phase may be completed by combining the three retargeted portions by displacing each of them, and patching the content of the scaled bounding box portion (which is being dragged) into the intermediate output in real time.

In this example, in phase 2, three new portions of the image may be defined in opposite dimension from those of the first phase (e.g., a top strip, bottom strip, and a horizontally-oriented center strip). These portions may be pre-processed and the intermediate output bounding box may be pre-process (e.g., using interpolated scaling). The second phase may include retargeting the three portions in real time as the user drags the bounding box in the second dimension. The second phase may be completed by combining the three portions by displacing each, and patching the content of scaled intermediate output bounding box portion (which is being dragged) into the output image in real time.

In some embodiments, the method described above may not provide satisfactory results in cases where there is important content in the extended bounds of the object selected to be scaled (e.g., if there is important content immediately above, below, to the left, and/or to the right of the selected bounds), especially if the important content extends outside the center portion of the image in one or both dimensions. Content in these portions would be seam carved or seam expanded, not scaled. However if this content is a shadow or reflection of the selected object, then this may provide an ancillary benefit, since this content would be resized along with, and in a manner dependent on, the resizing of the selected object, as would be expected (without being explicitly selected).

This methods described herein for in place scaling using content aware hybrid seam cropping or edge weighted seam expansion may allow users to apply in place up scaling while preserving the content of the image. In other words, these methods may ensure content that the user wants to preserve is not obscured. As described herein, these methods may not require any inputs other than the approximate bounding box selection, and the inputs provided by the user dragging an edge or corner of the bounding box to indicate the amount and direction of the scaling operation. In various embodiments, these methods provide the advantage that the user does not need to identify a precise selection of an object to be scaled in place, but only this simple bounding box. In some embodiments, the patching of a scaled version of the bounding box scaled may allow the methods to provide realistic results without introducing noticeable artifacts at the patch boundaries.

As described herein, in embodiments in which the methods support the use of a configurable crop tolerance, they may provide additional control on the movement of the high-energy areas in the direction of the scaling operation as the user scales the selected portion.

In some embodiments, the content aware hybrid seam cropping techniques described herein may be applied to content aware in place translation of a selected portion of an image (e.g., an image object), while preserving the image content. In general, to perform such content aware translations, a user may need to make a selection of the portion to be translated via any of various input means (e.g., a quick selection, magic wand, magnetic lasso, marquee tool, or bitmap brush of a graphical user interface). Rather than requiring the user to make exact selections and/or cutouts of image objects to be translated (which may require very high precision and experience), the methods described herein may allow such translations to be performed using approximate selections, which may be much easier to make. When translating a selected image object, there may be three image portions that need to be processed differently:

A portion of the image in which the translated selection 'overlaps' the original location of the translated selection A portion of the image in which the translated selection is 'outside' (i.e. not overlapping) the original location of the translated selection A portion of the image that is a 'hole' created in the image (for at least a portion of the original location of the translated selection) because of the transformation Based on the amount by which the selection is moved, the 'overlap' portion may not even exist, e.g., if the selection is moved far to one side or corner of the image. A method for performing content aware translation may need to consider the following:

Filling up a hole portion via interpolation may result in the image looking unrealistic and extremely pixelated in the hole area.

Moving the selection may cause occlusion of some other important portions of the image, which is undesirable.

Though the user may spend considerable time creating a cutout, when the cutout is moved, it may contain unwanted portions of its background that may not be compatible with the background in its new location.

In some embodiments, to invoke a content aware translation operation, a user may simply select the approximate bounding box of the cutout selection to be translated, and drag it to the desired location. As with in place scaling operations, based on the bounding box, the image may be broken into three portions in one dimension (e.g., for a horizontal move, the portions may be a left strip, a right strip, and a center strip comprising the selection). The portion opposite to the direction of motion may be seam expanded by x pixels and the portion along the direction of motion may be hybrid seam cropped by x pixels, where x is the amount by which the selection is displaced in chosen direction. For example, if the user selects a bounding box and drags it to the left, the portion to the right of the selection (e.g., the right side strip) may be seam expanded, and the portion to the left of the selection (e.g., the left side strip) may be hybrid seam cropped. In this example, an intermediate output may be formed by combining the retargeted portions on both sides of the center portion with the displaced center portion itself (where the center portion is translated by x pixels in the direction of motion). This intermediate output (which may be treated like a fresh input if the steps described above are repeated for a move in the other dimension) may be further broken into three new portions in the other dimension. These new portions may be hybrid seam cropped, displaced, and seam expanded, respectively, according to the direction and displacement amount for the move in the other dimension, and then rejoined to form the final output image.

Figure 13:
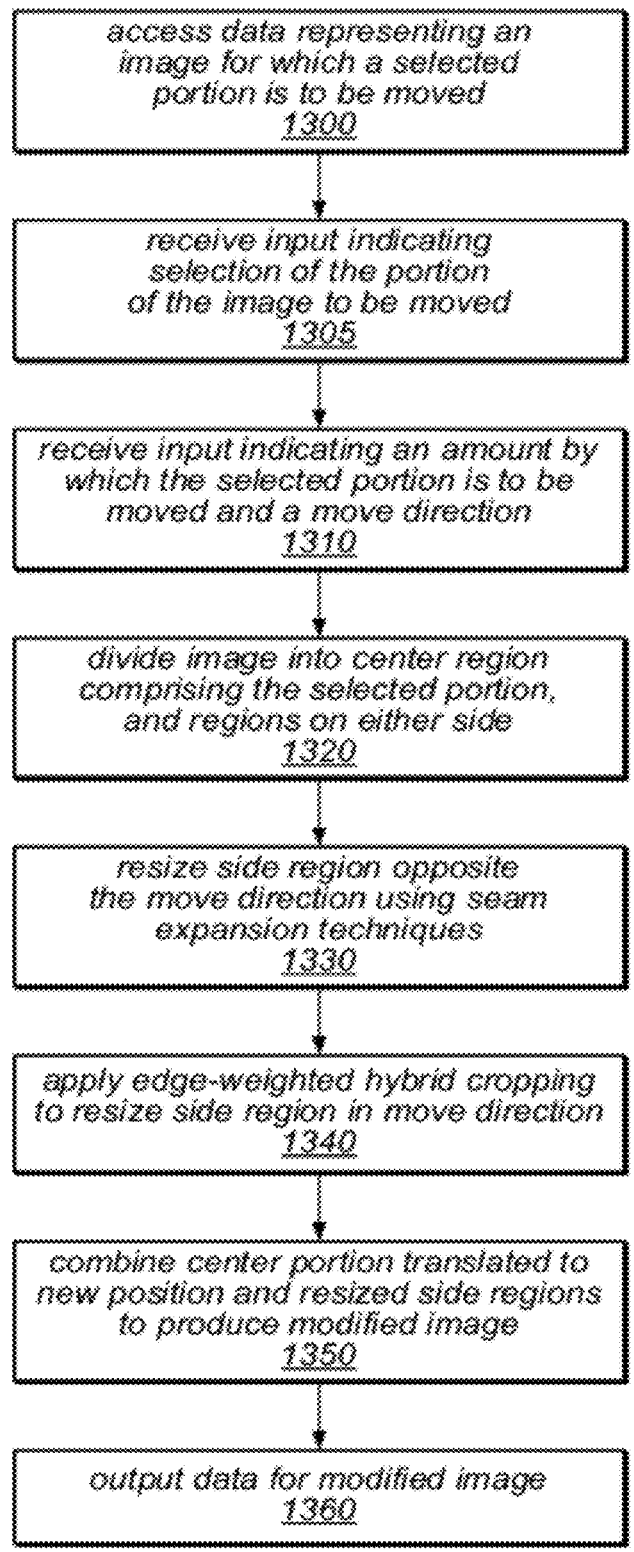
FIG. 13 is a flow chart illustrating a method for content aware translation of an image object using content aware hybrid seam cropping or edge weighted seam expansion, according to one embodiment.
Figure 14A:
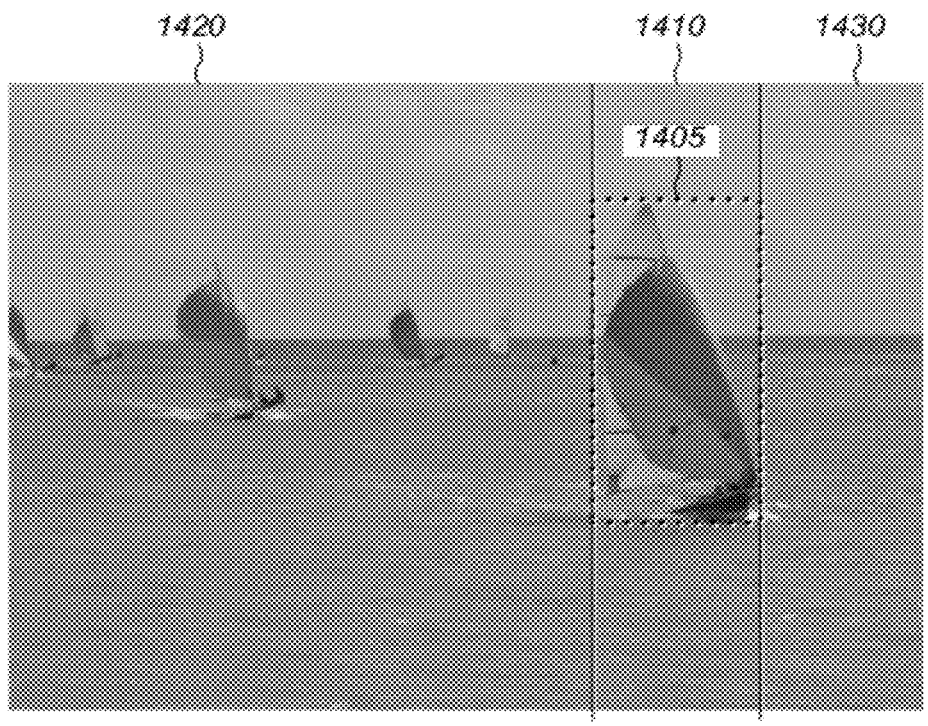
FIGS. 14A-14B illustrate an example of an object translation operation, according to one embodiment.
Figure 14B:
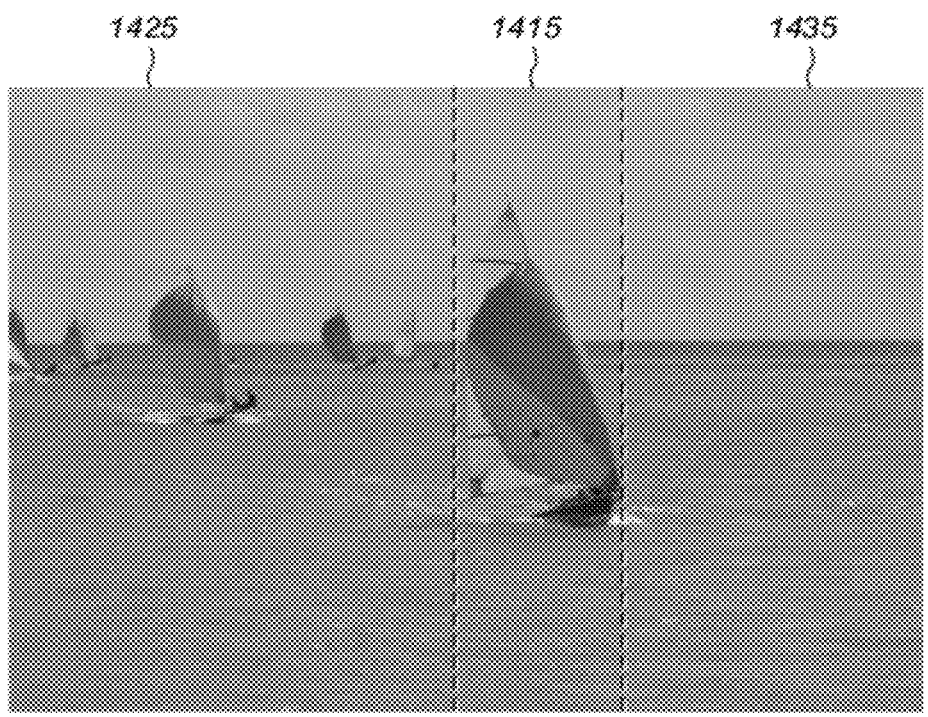

FIG. 13 is a flow chart illustrating a method for content aware translation of a portion of an image, using content aware hybrid seam cropping or edge weighted seam expansion, according to one embodiment. In this example, as in the method illustrated in FIG. 2, the method may include accessing data representing an image for which a selected portion (e.g., an image object) is to be translated, as in 1300. This data may be accessed in response to being imported into an image editing application, or may be resident in memory accessible to such an application as a result of being imported previously, or as a result of being created and/or modified by the application prior to the current resizing operation. In this example, the method may include receiving input indicating the selection of the portion of the image to be moved, as in 1305. For example, in various embodiments, a user may select an image object to be moved by defining an approximate rectangular bounding box roughly enclosing the image object using a selection tool of a graphical user interface of an image editing application.

In the example illustrated in FIG. 13, the method includes receiving input indicating an amount by which the selected portion of the image is to be moved, and indicating a move direction, as in 1310. As described above, this input may be received through one or more tools of a graphical user interface of the image editing application, such as by selecting and then dragging one of the edges or corners of the bounding box (e.g., using a "mouseDrag" and/or "mouseUp" operation) to indicate a target position for the selected image object. From this input, the move direction and the number of pixels by which the selection is to be moved may be determined. In other embodiments, a horizontal and/or vertical translation amount may be specified using another mechanism, such as an alphanumeric entry field of a graphical user interface.

In this example, the method illustrated in FIG. 13 may be applied in one dimension at a time. As illustrated in FIG. 13, the method may include dividing the image into three regions in the dimension of the resizing operation, as in 1320. For example, if the selected portion is to be translated in the horizontal dimension, the input image may be divided into three vertical strips. The three vertical strips may be defined by vertical lines containing the left and right bounds of the approximate bounding box of the selected portion of the image. Thus, one of the vertical strips includes the portion of the image to the left of the selected portion, one (the center strip) includes the selected portion of the image, and one includes the portion of the image to the right of the selected portion.

In this example, the method may include resizing the side region opposite the move direction in the horizontal dimension to fill in the hole created by the translation, as in 1330. In some embodiments, this side strip may be resized using a standard seam expansion technique. For example, if the selected portion is to be moved to the left by x pixels, the portion of the image opposite to the direction of motion (the portion to the right of the selection) may be seam expanded such that it expands by x pixels.

In order to give a translated effect to the output image for the translated center strip, the method may include resizing the other side region of the image (i.e., the vertical strip adjacent to the selection in the direction of the translation) by applying edge-weighted hybrid seam cropping to this vertical strip, where the weighting applied to each pixel is dependent on its distance from the center strip, as in 1340. In this example, the method may include applying hybrid seam cropping to the portion in the direction of motion (e.g., the region to the left of the selection) to contract that portion by x pixels. In various embodiments, the crop tolerance or crop graph may or may not be configurable and/or exposed to the user. In some experiments, a crop tolerance of 0.5 provided good results. This crop tolerance may in some embodiments be used as the default value by the methods described herein.

Once the two side regions have been resized, the method may include producing a modified image in which the selection portion has been translated by combining the center strip (in its new position) and the resized side strips (one of which has been seam expanded by x pixels, and the other of which has been hybrid seam cropped by x pixels), as in 1350. Data representing the modified image may then be output, as in 1360. As in previous examples, the modified image may be displayed to the user and/or the output data may be stored for further processing or for other purposes.

Content aware translation of image objects using content aware hybrid cropping or edge weighted seam expansion and seam carving/expansion of images may be further described by way of the examples illustrated in FIGS. 14A-14B, and 15A-15B. In these examples, the respective selected portions have been moved to the left by fixed amounts, and the crop tolerance is set to 0.5. In the example illustrated in FIGS. 14A-14B, the large boat on the right side of input image 14A is translated to the left by 120 pixels. As described above, to translate the boat, the methods described herein may not require the selection of a cutout of the boat, but simply the selection of an approximate bounding box, shown as 1405. Based on this approximate bounding box and the fact that the selected portion is to be translated in the horizontal dimension, the input image is divided into three vertical strips, as defined by the solid vertical lines in FIG. 14A. Vertical strip 1410 includes the portion of the image defined by the bounding box (and comprising the selected boat), as well as the portions of the image directly above and below the bounding box. Vertical strip 1420 includes the portion of the image to the left of the center strip, and vertical strip 1430 includes the portion of the image to the right of the center strip.

In this example, hybrid seam cropping, as described herein, is applied to vertical strip 1420 to contract it by 120 pixels. The result is shown as the contracted vertical strip 1425 in FIG. 14B. In this example, a standard seam expansion operation is applied to vertical strip 1430 to expand it by 120 pixels. The result is shown as the expanded vertical strip 1435 in FIG. 14B. In this example, the center vertical portion comprising the selected boat is not resized, but is translated to the left by 120 pixels for the output image. This is shown as translated vertical strip 1415 in FIG. 14B. As shown in the output image illustrated in FIG. 14B, the three image portions 1425, 1415, and 1435 (shown as divided by two dashed vertical lines) are appended to each other to form the result of the content aware translation operation.

Figure 15A:
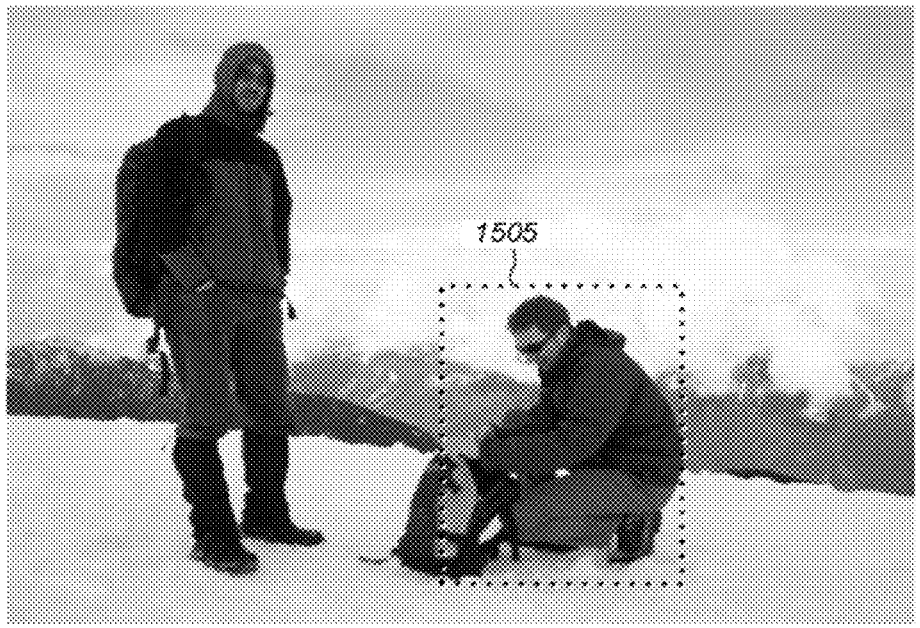
FIGS. 15A-15B illustrate another example of an object translation operation, according to one embodiment.
Figure 15B:

In the example illustrated in FIGS. 15A-15B, the man on the right in input image 15A is translated to the left by 40 pixels. As described above, to translate the man, the methods described herein may not require the selection of a cutout of the man, but simply the selection of an approximate bounding box 1505. Based on this approximate bounding box and the fact that the selected portion is to be translated in the horizontal dimension, the input image is divided into three vertical strips. A center vertical strip includes the portion of the image defined by the bounding box (and comprising the selected man), as well as the portions of the image directly above and below the bounding box. A second vertical strip includes the portion of the image to the left of the center strip, and a third vertical strip includes the portion of the image to the right of the center strip.

In this example, hybrid seam cropping, as described herein, is applied to the vertical strip on the left to contract it by 40 pixels. In this example, a standard seam expansion operation is applied to the vertical strip on the right to expand it by 40 pixels. In this example, the center vertical portion comprising the selected man is not resized, but is translated to the left by 40 pixels for the output image. As shown in the output image illustrated in FIG. 15B, the three image portions (the contract left strip, the translated center strip, and the expanded right strip) are appended to each other to form the result of the content aware translation operation. Notice how, in this example, the selected man's bag also gets translated, even though it was not completely enclosed by bounding box 1505.

In each of the examples above, the selection was translated in the horizontal dimension (left). If it had been moved in the vertical dimension (e.g., up), the image would have been divided into three horizontal portions via two horizontal lines defined by the top and bottom edges of the bounding box. Then the method would continue in much the same manner as for a horizontal translation, with one horizontal strip being seam expanded and another being hybrid seam cropped to make room for the translated selected in it new location.

As previously noted, seam carving/expansion, hybrid seam cropping, and edge weighted seam expansion operations may be thought of as performing two main steps: pre-processing and retargeting. In some embodiments, in order to achieve real time performance of content aware translation operations in one dimension, the concept of multi-size images may be applied to the operations. In such embodiments, multiple representations of the input image having footprints of between 1×1 and m×n may be preprocessed and stored for use in the in place scaling operations. As with in place scaling operations, for content aware translations, the method may include passing both side portions of the image to the pre-processing procedure. In a multi-core processing environment, the pre-processing steps applied to each portion may be performed simultaneously, in some embodiments. In the retargeting step, the method may take the output of pre-processing step as input and may apply the appropriate modification on each of the side portions according to the pre-processed representations of that portion. In some embodiments, preprocessing of multi-size images may allow the method to perform quick real time content aware translations, as only the retargeting itself may need to be performed in real time. Thus, the methods may in some embodiments allow the selection to be moved one pixel at a time as the user executes a mouseDrag.

While many of the examples described herein involve content aware translations in one dimension (e.g., horizontally or vertically), in general, the methods described herein may be applied to translate an image or image object in two dimensions. In some embodiments, the system may not support content aware translations in two dimensions in real time. For example, the method illustrated in FIG. 13 and described above, may be applied in one dimension first, and then in the other dimension. In such embodiments, the output of the operation performed in one dimension may be used as the input to the operation to be performed in the second dimension. In some embodiments, if the height of the selection divided by the height of the input image is greater than the width of selection divided by the width of input image, the methods may be applied first in the horizontal dimension and then in the vertical dimension; and vice versa. In this example, when the user makes a bounding box selection and drags it to translate it by some amount, the user may not be shown any real time updates. In various embodiments, the methods may use different crop tolerances or crop graphs for each dimension or may use the same crop tolerance or crop graph for both dimensions.

In one embodiment, a method for performing content aware translation in two dimensions may include the following steps:

- Divide the input image into three portions in one dimension, as described above.
- Pre-process two of the portions (e.g., pre-process for hybrid seam cropping in the direction of motion and pre-process for seam expansion in the direction of motion). These pre-processing operations may be done independently for each portion using multi-core processors.
- Retarget the two portions according to the displacement of the bounding box area in the first dimension.
- Create an intermediate output by appending the retargeted portions to either side of the translated center portion.
- Divide this intermediate output into three portions in the other dimension.
- Pre-process two of the portions in the other dimension (e.g., pre-process for hybrid seam cropping in the direction of motion and pre-process for seam expansion in the direction of motion). These pre-processing operations may be done independently for each portion using multi-core processors.
- Retarget the two portions in the other dimension according to the displacement of the bounding box area in the other dimension.
- Create an output by appending the retargeted portions to either side of the translated center portion.
- Render the final output when user input indicates the end of the translation operation (e.g. on a "mouseUp"). In some embodiments, there may be a delay while the final output is rendered.

Note that in the example above, when the user makes a bounding box selection and drags it to a location of his choice, the user may not be shown any real time updates.

To approach real-time performance for content aware translation operations in two dimensions, the techniques involving multi-size images described above with respect to in place scaling may in some embodiments be applied to content aware translation operations. As described above, in some such embodiments, this may require that the user first indicate a desired translation for the object in one dimension and then indicate a desired translation for the object in the other dimension, as the user drags the bounding box to translate the selection. In one such embodiment, a user input mechanism (e.g., the mouse) may be restricted to being dragged in one direction at a time, as described above.

In some embodiments, a method for performing two-dimensional content aware translation operations at near real-time speeds may include two complete phases (each of which may include pre-processing and retargeting steps, as described herein). The first pre-processing phase may be triggered when the selection of the bounding box is completed. In the preprocessing step, based on an initial restricted direction of motion, the method may include applying pre-processing on two portions (e.g., a left strip, and a right strip) as soon as the selection is made. These two portions may be retargeted in real time as the user drags the selection restrictedly in one direction. The first phase may be completed by appending the two retargeted portions on either side of the translated bounding box portion (which is being dragged) in an intermediate output in real time.

In this example, in phase 2, three new portions of the image may be defined in opposite dimension from those of the first phase (e.g., a top strip, bottom strip, and a horizontally-oriented center strip). Two of these portions may be pre-processed, as described above, according to the amount and direction of displacement in the second dimension. The second phase may include retargeting these two portions in real time as the user drags the bounding box in the second dimension. The second phase may be completed by appending the two retargeted portions on either side of the translated bounding box portion (which is being dragged) in the output image in real time. In some embodiments, a method for performing content aware translation operations at near real-time speeds may include multiple combinations of the operations described for phase 1 and phase 2, e.g., corresponding to multiple iterations of a two-dimensional translation broken into smaller translations in each dimension. An advantage of this approach may be that it may give a more realistic movement of the cursor than in the method described above. A disadvantage may be that it may be slower than the method described above.

In some embodiments, the method described above may not provide satisfactory results in all cases. For example, it may not provide good results if the portion in the direction opposite to move direction is too thin. Since this portion is seam expanded, rather than scaled, any artifacts created by seam expansion may be more clearly visible than if this portion were scaled. In another example, if the selection is small as compared to the image, and if there is additional important content in the center portion (e.g., above or below the selection bounds when selection is moved horizontally)

that also extends outside the center portion, the methods may not provide good results. This is because the entire center portion is moved, rather than just the selected portion. However, in some cases, this may be a benefit of the methods (e.g., when a shadow or reflection of a translated object is also translated). Another limitation of these methods may be that very large translations may cause the number and/or severity of artifacts to increase, as one portion may be seam carved by a large amount another portion may be and seam expanded by a large amount, too. In such cases, filling the gap portion via another means (e.g., interpolation) may yield more realistic results.

This methods described herein for content aware translation using content aware hybrid seam cropping and/or edge weighted seam expansion may allow users to apply content aware translations while preserving the content of the image. In other words, these methods may ensure that a hole created by a translation may be filled without introducing noticeable artifacts, and may at the same time ensure that any content that the user wants to preserve is not obscured. As described herein, these methods may not require any inputs other than the approximate bounding box selection, and the inputs provided by the user dragging an edge or corner of the bounding box to indicate the amount and direction of the scaling operation. In various embodiments, these methods may provide the advantage that the user does not need to identify a precise selection of an object to be scaled in place, but only this simple bounding box. This may be well suited, for example, in cases in which the user wishes to move one person in an image closer to a group of people. The methods described herein may result in all of them moving closer together one by one, without losing the important contents of the image. In some cases, limitations of the method may instead be considered advantages, such as when reflections are automatically moved along with an object, even if they were not explicitly selected for translation. In some embodiments, the use of a configurable crop tolerance may provide more control of the movement of the high-energy areas in the move direction as the user moves the selected portion.

In some embodiments, the computations required for performing image editing (e.g., the seam carving/expansion, edge weighted seam expansion, and/or hybrid seam cropping techniques described herein) may be accelerated through the use of pyramidal retargeting. Pyramidal retargeting may be used to generate a lower-resolution image on which to apply various techniques, such that they may be executed more efficiently than when applied to a full-resolution image. For example, for an image having more than 2000×2000 pixels, it may be difficult to achieve interactive performance in resizing and other image editing operations. Therefore, in some embodiments, an image pyramid may be generated to represent the image, and a solution may be computed on a higher level of the image pyramid (i.e., one which represents a lower-resolution version of the image). That solution may then be projected onto a lower pyramid level (e.g., the full resolution image or another version of the image having a higher resolution than the version on which the solution was computed) in order to obtain the solution faster than if it were computed on the full-resolution image. For example, for a 4000×4000 resolution image (level 0), a pyramid may be generated in which the second level (level 1) is 2000×2000, the third level (level 2) is 1000×1000, the fourth level (level 3) is 500×500, and so on. A pyramid level on which to work may be selected such that the solution may be efficiently computed at interactive speed and a preview result may be displayed for the user, and then this solution may be projected onto another level of the image pyramid to produce the final result. In one embodiment, for each level of the pyramid, a Gaussian filter may be applied. In other embodiments, an image pyramid may be generated using other functions (e.g., an average, sum, bi-cubic, maximum, nearest neighbor, etc.) to reduce the image size to a level that can be operated on interactively.

In one example, each point in the image pyramid has a pixel value, indicating a color, intensity, and/or other property of the pixel. Each of the points on level 1 of the pyramid may represent an acceleration data value for a block of two pixels on level 0. For example, the pixel value of each point on level 1 may be the result of an associative operation on the values of two pixels on level 0 (e.g., a sum, difference, average, minimum, or maximum values of the pixels on level 0), or the result of any other suitable function (e.g., a bi-cubic, nearest neighbor, or Gaussian filter) applied to those pixel values. In this example, each of the points on level 2 of the pyramid may represent an acceleration data value for a block of four pixels on level 0 (or two pixels on level 1). In various embodiments, the acceleration data values for each of the points on a given level of the pyramid may be generated by performing an associative operation on the pixel values of the input image, or on acceleration data values for a lower level of the acceleration data structure.

Pixel values for one or more accelerated images (i.e., image pyramid data) may be stored in any appropriate data structure, including, but not limited to, one or more tables, databases, lists, linked lists, or arrays, in various embodiments. In some embodiments, such acceleration data may be computed by a software application executing in parallel on two or more GPUs, in some embodiments. For example, an acceleration table may be generated for one level of acceleration on one graphics processor while an acceleration table is generated for another level of acceleration on a second graphics processor. In another example, an acceleration table may be generated for one associative operation on one graphics processor while an acceleration table for another associative operation is generated on a second graphics processor. In yet another example, acceleration data may be generated for one portion of an image on one graphics processor while acceleration data for another portion of the image is generated on a second graphics processor. The acceleration data generated by multiple processors in any of these examples, or in other embodiments, may all be stored in one acceleration data structure or may be partitioned into multiple acceleration data structures, as described above.

As described above, an image editing solution (e.g., for a seam carving/expansion, edge weighted seam expansion, or hybrid seam cropping operation, as described herein) may be computed at a higher level of the pyramid than will ultimately be output and may be displayed as a preview result to a user before being projected to a lower level of the pyramid to produce the final output image. In some embodiments, an image editing operation may perform seam carving/expansion, edge weighted seam expansion, or hybrid seam cropping, as described herein, within a band of the higher-resolution version of the image defined by the solution found at the higher pyramid level, based on local content in the higher-resolution version of the image. In other words, the high level pyramid may used to determine a band in which to apply seam carving/expansion, edge weighted seam expansion, or hybrid seam cropping at the lower level (e.g., to identify the lowest energy portion of the band).

In various embodiments, for every seam identified for removal in a lower-resolution version of the image, the number of seams to be removed in a higher-resolution version is the number of seams identified in the lower resolution version multiplied by 2 times the level difference of the higher-resolution image. For example, if the lower-resolution solution was computed on level 2 of the image pyramid, and the solution is to be projected to level 0, every pixel in the lower-resolution solution represents a 4×4 set of pixels in the level 0 solution. Therefore, every seam in the lower-resolution version of the image corresponds to 4 seams in the higher-resolution version. In this example, if the solution computed on the lower-resolution version indicated that 2 seams should be removed, 8 seams must be removed from the higher-resolution image.

Figure 16:
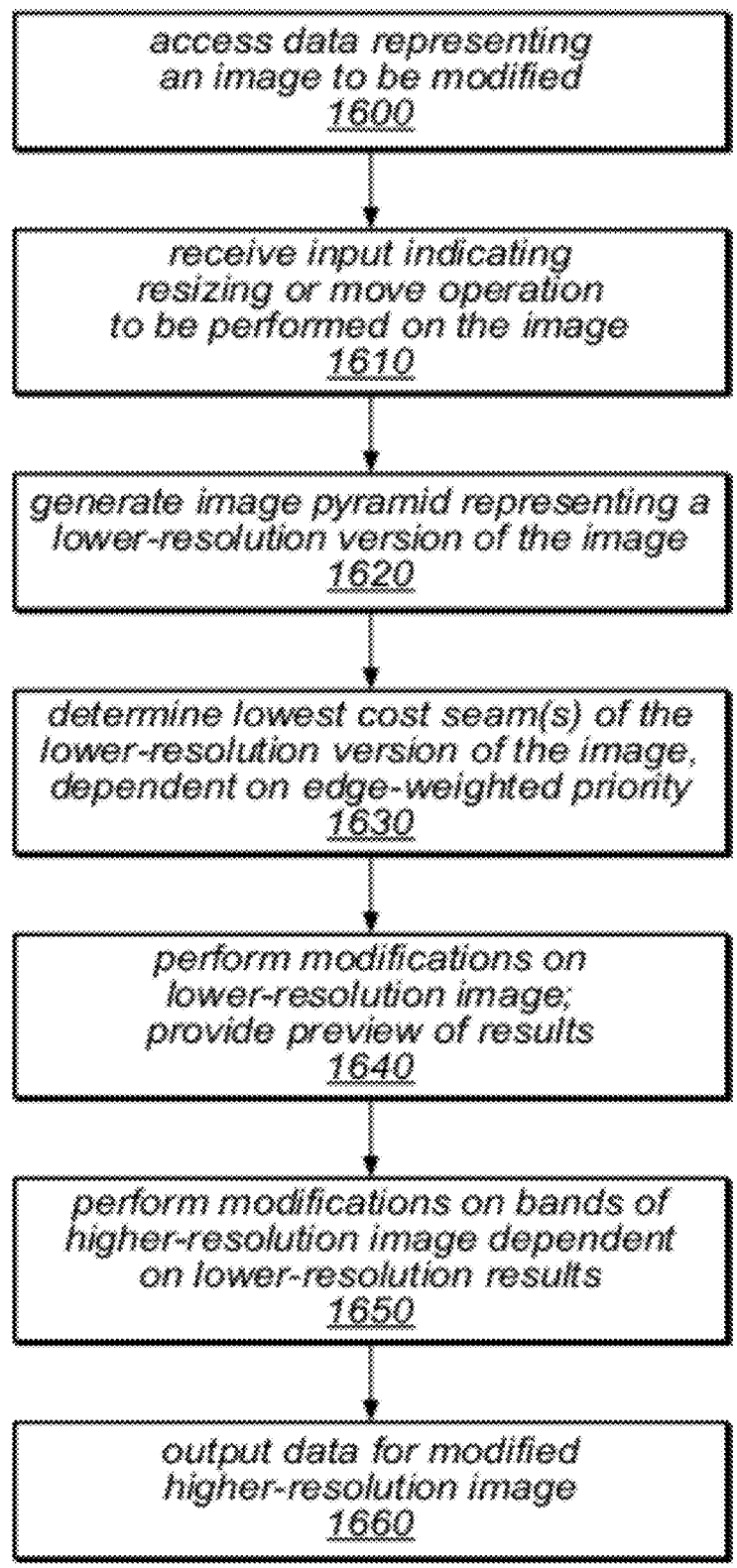
FIG. 16 is a flow chart illustrating a method for modifying an input image using content aware hybrid seam cropping or edge weighted seam expansion dependent on identification of low-cost seams in a lower-resolution version of the image, according to one embodiment.

One embodiment of a method for modifying an input image using content aware hybrid seam cropping or edge weighted seam expansion dependent on identification of low-cost seams in a lower-resolution version of the image is illustrated by the flow chart in FIG. 16. In this example, the method includes accessing data representing an image to be modified, as in 1600, and receiving input indicating a resizing or move operation to be performed on the image, or on a portion thereof, as in 1610. In this example, the method may include generating an acceleration data structure, or image pyramid, representing a lower-resolution version of the image, as in 1620. The image pyramid may be generated based on the sum, difference, average, minimum, or maximum values of the pixels in the input image, or using any other suitable function (e.g., a bi-cubic, nearest neighbor, or Gaussian filter), in different embodiments. The image pyramid may have any number of acceleration levels, and any of these levels may be used in determining a band in which to apply various resizing operations (e.g., seam carving or expansion, edge weighted seam expansion, hybrid seam cropping, in place scaling or image objects, or content aware translation of image objects) or in generating a solution on a lower-resolution version of the image that is to be projected onto the input image. In some embodiments, respective energy values may be determined for each of the values in the acceleration data structure. In other embodiments, respective energy values may be determined for the pixel values of the input image, and these energy values may be propagated in the image pyramid. In other words, a function may be applied to energy values corresponding to the pixels of the input image to determine the values in the acceleration data structure, rather than populating the acceleration data structure with values derived as a function of the input image pixel values and then determining energy values from those derived values.

In this example, the method may include determining one or more of the lowest-cost seam(s) of a lower-resolution version of the image represented by one of the levels of the image pyramid, as in 1630. The cost of each seam may be determined using any of the methods described herein, or any other suitable method, in different embodiments. For example, for images (or portions thereof) on which edge- or corner-weighting is to be employed in the operation, the cost of each seam may be dependent on the weighted energy values of the pixels of the seam, and these weighted energy values may be dependent on the distance of the pixels to a selected edge or corner of the image or image portion, as described above.

In this example, once the lowest-cost seams are identified, various modifications (such as those described herein) may be applied to the lower-resolution version of the image, as in 1630. In some embodiments, results of these modifications may be presented to the user as a preview result, e.g., to provide feedback during an iterative editing operation at interactive speeds. Once the user is satisfied with the preview result, the modifications may be projected to the higher-resolution input image and/or applied within one or more bands of seams in the higher-resolution input image corresponding to the low-cost seams identified in the lower-resolution version of the image, as in 1640. These modifications may in various embodiments be performed on the input image and/or within each band of the input image (e.g., dependent on local content, edge- or corner-weighting, etc.) using any of the methods described herein, or using another suitable method. For example, the modifications may be performed using standard or enhanced seam-based methods (e.g., by removing or replicating one or more seams of the input image corresponding to a low-cost seam in the lower-resolution image), using scaling techniques (e.g., as applied to one or more seams of the input image corresponding to a low-cost seam in the lower-resolution image), using hybrid seam cropping techniques, or using a combination of these and/or other methods. Note that, in some embodiments, image bands may be identified and modified one at a time, and a re-calculation may be performed after each modification to identify the next band to be modified (not shown), rather than identifying multiple bands to be modified from the input image.

In this example, once the higher-resolution input image has been modified according to the solution identified in the lower-resolution version of the image, data representing the modified image may be output, as in 1660. The modified image may be displayed to the user and/or the output data may be stored for further processing or for other purposes, as described above. Note that the method illustrated in FIG. 16 may in various embodiments be applied to reduction of an image or a portion thereof, expansion of an image or a portion thereof, content aware translation of an image region or object, or to any similar image editing operations in order to modify the input image, as desired.

Figure 17:
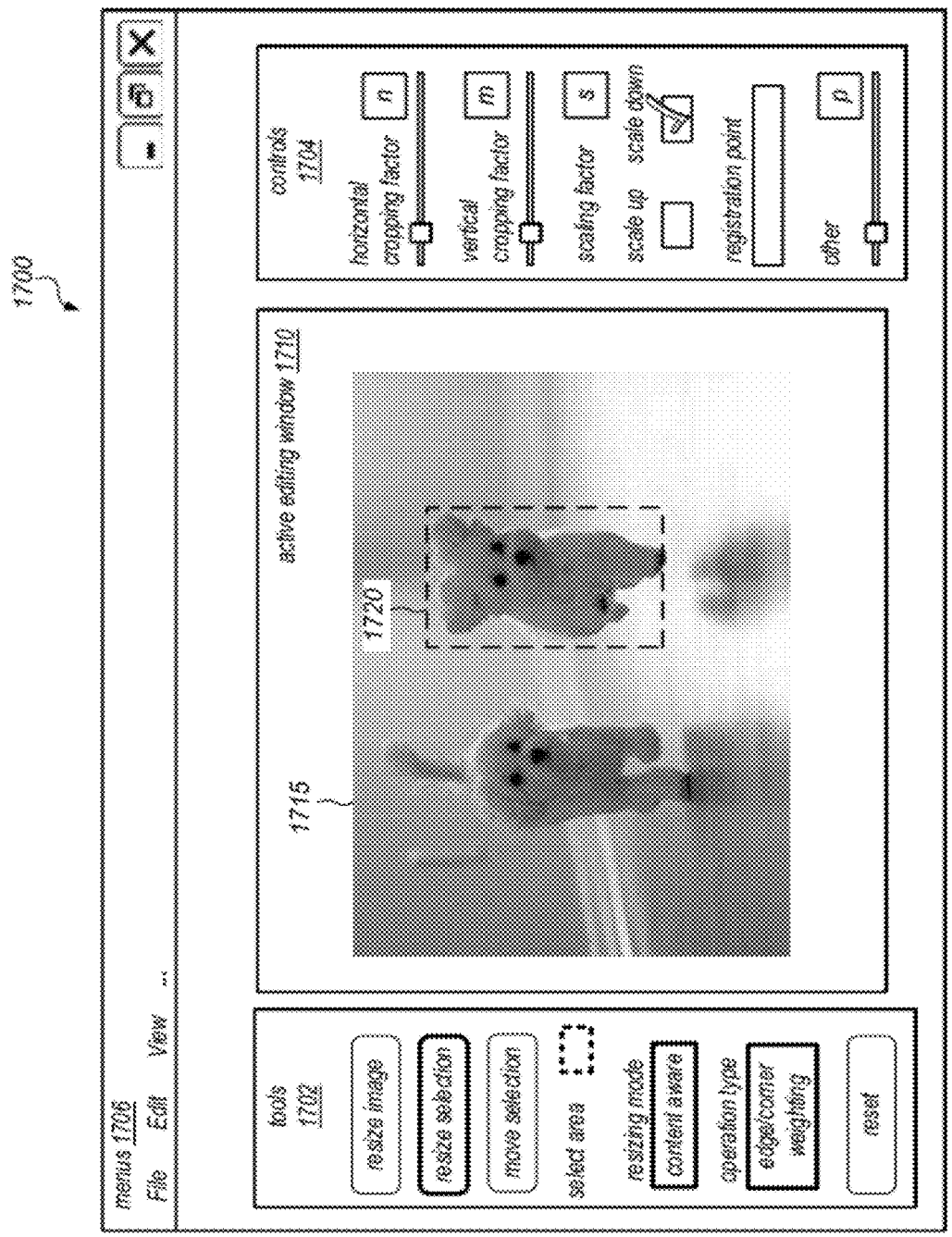
FIG. 17 illustrates a graphical user interface of an image editing application that provides content aware hybrid seam cropping or edge weighted seam expansion, according to various embodiments.

In different embodiments, a system configured to perform the image editing operations described herein may provide various input mechanisms with which the user may indicate selections and/or input values for various parameters. For example, in some embodiments, an image editing application providing the seam carving/expansion, edge weighted seam expansion, and hybrid seam cropping functionality described herein may include a graphical user interface (GUI), which may present selection tools, slider bars, pop-up menus, pull-down menus, dials, text entry boxes, or other mechanisms for identifying selected images or portions thereof, for selecting image editing operations to be applied to these images or portions thereof, or for specifying values or relative values of various configurable parameters. For example, FIG. 17 illustrates a GUI of an image editing application (or image editing module of another type of application) that may provide mechanisms for a user to apply the image editing techniques described herein and to adjust one or more parameters of these seam carving/expansion operations, scaling operations, edge weighted seam expansion operations, and/or hybrid seam cropping operations, according to one embodiment. In this example, an image editing module may provide a selection tool and one or more user interface elements whereby a user may select and control the application of the content aware image editing techniques described herein. The user interface may also provide user interface elements for controlling various aspects of other image editing operations and/or for performing other image-related tasks. The user interface illustrated in FIG. 17 is provided as an example of one possible implementation, and is not intended to be limiting.

FIG. 17 illustrates an example display 1700 depicting various frames that may be visible to a user during an image editing operation. In this example, the display is divided into four regions or areas: menus 1706, tools 1702, controls 1704, and active editing window 1710. Tools 1702 may include one or more user-selectable user interface elements. In this example, it is this area that contains the user interface elements that a user may select to apply various editing operations (e.g., resizing and/or move operations) to an image. In the example illustrated in FIG. 17, the user may select a resizing operation (e.g., "resize image" or "resize selection") or a translation operation (e.g., "move selection"). If the user selects "resize selection" the user may be prompted to select a portion of the image 1715 being edited in active editing window 1710, e.g., using a selection tool of tool area 1702. For example, the user may select the dog on the right side of image 1720 by defining an approximate bounding box 1720 using the selection tool of tool area 1702 (e.g., using a mouse, touch pad, keyboard, track ball, etc. to move a cursor across the image to draw the bounding box).

In this example, the user may also specify the mode and/or type of the resizing operation to be applied to image 1715 or a selected image object defined by bounding box 1720. In this example, the user has selected a content aware resizing operation for the selected dog, dependent on edge-corner weighting, as described herein. Therefore, to resize the selected dog, the user may select and drag one of the edges or corners of bounding box 1720 to indicate the amount of resizing to be performed and the edge/corner priority to be used in completing the resizing operation, as described herein (e.g., in FIG. 9). Similarly, to move the selected dog, the user may select and drag one of the edges or corners of bounding box 1720 while a "move selection" operation is active to indicate a new location for the dog in the output image.

In the example illustrated in FIG. 17, controls 1704 may include one or more user-modifiable controls, such as slider bars, dials, pop-up menus, alphanumeric text entry boxes, check boxes, etc., for specifying various parameters of a resizing move operation that is to be applied to an image. In this example, slider bars are provided for specifying a horizontal cropping factor, and a vertical cropping factor. An additional slider bar is illustrated for specifying an additional parameter of an image editing operation ("other"). In other embodiments, control area 1704 may include other input mechanisms such as pull-down menus, text entry boxes or other mechanisms usable to specify a horizontal cropping factor and/or vertical cropping factor. In some embodiments, the amount of scaling (i.e. a horizontal and/or vertical scaling factor) to be applied in the editing operation and/or the direction of the scaling (e.g., up or down) may be specified using one or more of the user input mechanisms illustrated in control area 1704, instead of, or in combination with, a dragging operation. In some embodiments a user may specify a registration point for a resizing operation through an input mechanism in control area 1704.

Other optional tools may be selected in tool area 1702 as well, such as a reset function. While FIG. 17 illustrates several of the elements in tools 1702 as buttons, other types of user interface elements, such as pop-up menus, pull-down menus, or text entry boxes, may be used to select from among one or more tools in various embodiments. In various embodiments, the reset tool illustrated in FIG. 17 may or may not be included in the user interface. Various embodiments may include other tools not shown as well, such as an "undo" tool that undoes the most recent user action in active editing window 1710.

In the example illustrated in FIG. 17, menus 1706 may include one or more menus, for example menus used to navigate to other displays in the image editing application, open files, print or save files, undo/redo actions, view one or more selected representations of images, and so on. In some embodiments, an image representation (e.g., a file containing image data, metadata, etc.) may be identified by the user through the "file" option in menu area 1706. This menu item may include, for example, a user-selectable pull-down option for importing images or frames from an identified file. In the example illustrated in FIG. 17, active editing window 1710 is the area in which an image being edited is displayed as various editing operations are performed. In various embodiments and at various times, active editing window 1710 may display a portion or all of an original input image to which editing operation is to be applied, a portion or all of preview result image, an output image, or any intermediate image produced as part of the image editing operation, as described herein.

In the example illustrated in FIG. 17, menu 1706 includes a "view" option. This menu item may include, for example, a user-selectable pull-down or pop-up menu usable to select which of various representations of an image are displayed in active editing window 1710, or in another area of display 1700. In other embodiments, different input mechanisms may be provided for selecting a view to be displayed, such as one or more radio buttons, alphanumeric text boxes, dials, etc. In this example, one of the available viewing options is a "split view", in which two or more representations of an image may be simultaneously displayed (e.g., an input image and corresponding preview result image may be displayed while the user iteratively applies an editing operation). In some embodiments, as the user iteratively applies the techniques described herein, the system may be configured to automatically update and/or store the data representing these modified image views. The system may also be configured to automatically refresh the images being displayed in response to these updates.

In some embodiments, a user may be prompted to provide one or more of the inputs described above in response to invoking a resizing or move operation of the image editing application. In other embodiments, the image editing application may provide default values for any or all of these inputs. In some embodiments, the user may be allowed to override one or more default filter parameter values using an interface similar to that illustrated in FIG. 17.

Figure 18:
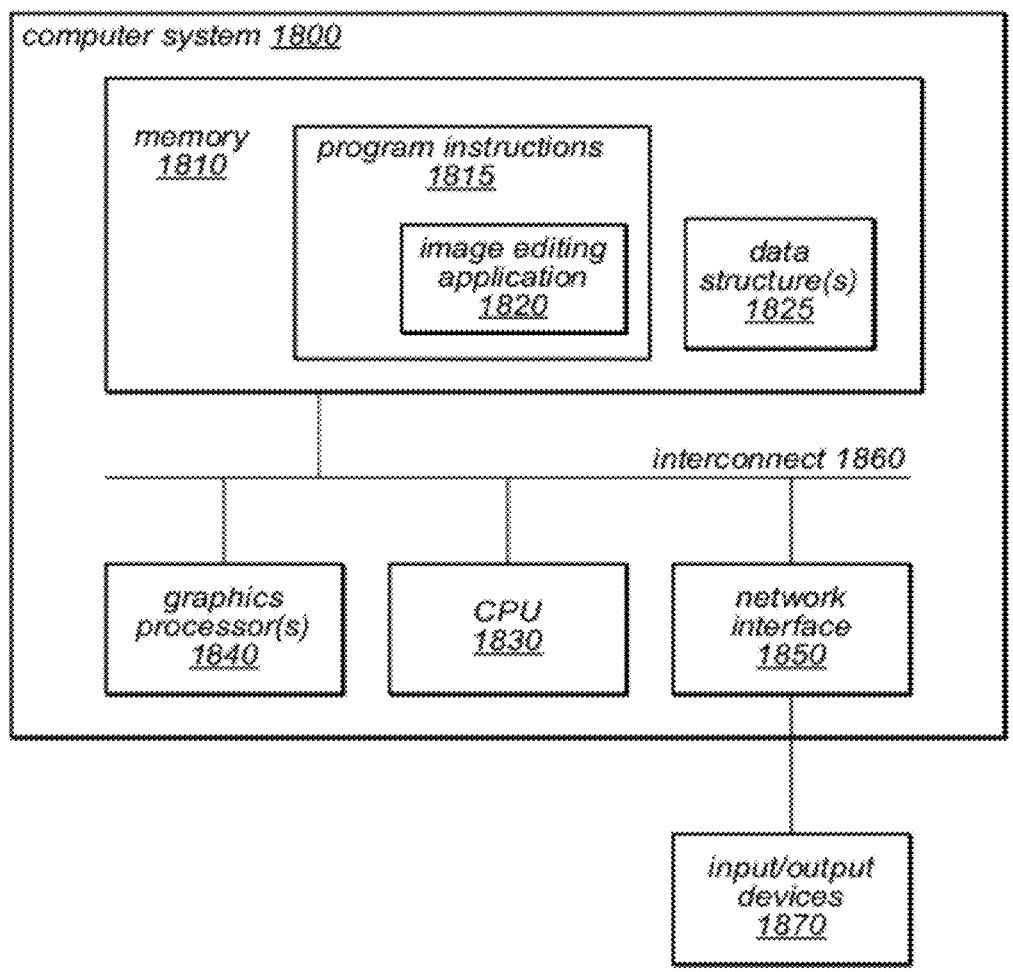
FIG. 18 illustrates a computer system configured to implement an image editing application that provides content aware hybrid seam cropping or edge weighted seam expansion, according to one embodiment.

The methods described herein for performing resizing and/or move operations on images (e.g., within a graphics application) may be implemented by a computer system configured to provide the functionality described. FIG. 18 is a block diagram illustrating one embodiment of a computer system 1800 configured to implement such image editing operations. An image editing application such as image editing application 1820 may be configured to perform resizing and/or move operations on image data as part of various editing functions and to render new images according to the resizing. For example, image editing application 1820 may perform reductions, expansions, hybrid seam cropping, edge weighted seam expansion, object scaling, and/or object translations on various images using any of the seam-based techniques, scaling techniques, and/or hybrid seam cropping techniques described herein to modify an input image, according to various embodiments. Image editing application 1820 may be configured to render the modified image to a separate window, or directly into the same frame buffer containing the input image, in different embodiments.

Image editing application 1820 may represent (or be a module of) various types of graphics applications, such as painting, publishing, photography, games, animation, and other applications. Additionally, image editing application 1820 may utilize a graphics processor 1840 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1840 may implement a number of graphics primitive operations in a way that makes executing them much faster than drawing directly to the screen with a host central processing unit (CPU), such as CPU 1830. In various embodiments, the methods disclosed herein for generating acceleration data structures and/or the methods disclosed herein for performing resizing and/or move operations on an image may be implemented by program instructions configured for parallel execution on two or more such GPUs. The GPU 1840 may implement one or more application programmer interfaces (APIs) that permit programmers to invoke the functionality of the GPU. Suitable GPUs may be commercially available from vendors such as NVIDIA Corporation, ATI Technologies, and others.

Please note that functionality and/or features described herein as being part of, or performed by, image editing application 1820 may, in some embodiments, be part of, or performed by, one or more graphics processors, such as graphics processor 1840. As described above, in some embodiments graphics application 1820 may be configured to render modified images into a different window than input images.

Editing of images, as described herein, may be implemented on various types of computer systems. Referring again to FIG. 18, computer system 1800 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Image editing application 1820, which may be configured to implement the image editing techniques described herein, may be provided as a computer program product, or software, that may include a computer-readable storage medium having stored thereon instructions, which may be used to program a computer system (or other electronic devices) to implement image editing, as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 18, computer system 1800 may include one or more processor units (CPUs) 1830. Processors 1830 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1800, such as various versions of Unix, Linux, Windows™ from Microsoft Corporation, MacOS™ from Apple Corporation, or any other operating system that enables the operation of software on a hardware platform.

The computer system 1800 may also include one or more system memories 1810 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1800 via interconnect 1860. Memory 1810 may include other types of memory as well, or combinations thereof. One or more of memories 1810 may include program instructions 1815 executable by one or more of processors 1830 to implement aspects of the image editing techniques described herein. Program instructions 1815, which may include program instructions configured to implement image editing application 1820, may be partly or fully resident within the memory 1810 of computer system 1800 at any point in time. Alternatively, program instructions 1815 may be provided to GPU 1840 for performing resizing and/or move operations (or portions thereof) on GPU 1840 using one or more of the techniques described herein. In some embodiments, the techniques described herein may be implemented by a combination of program instructions 1815 executed on one or more processors 1830 and one or more GPUs 1840, respectively. Program instructions 1815 may also be stored on an external storage device (not shown) accessible by the processor(s) 1830 and/or GPU 1840, in some embodiments. Any of a variety of such storage devices may be used to store the program instructions 1815 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1830 and/or GPU 1840 through one or more storage or I/O interfaces including, but not limited to, interconnect 1860 or network interface 1850, as described herein. In some embodiments, the program instructions 1815 may be provided to the computer system 1800 via any suitable computer-readable storage medium including memory 1810 and/or external storage devices described above. Memory 1810 may also be configured to implement one or more data structures 1825, such as one or more acceleration data structures and/or structures configured to store data representing one or more input images, output images, or intermediate images. Data structures 1825 may be accessible by processor(s) 1830 and/or GPU 1840 when executing image editing application 1820 or other program instructions 1815.

As shown in FIG. 18, processor(s) 1830 may be coupled to one or more of the other illustrated components by at least one communications bus, such as interconnect 1860 (e.g., a system bus, LDT, PCI, ISA, or other communication bus type), and a network interface 1850 (e.g., an ATM interface, an Ethernet interface, a Frame Relay interface, or other interface). The CPU 1830, the network interface 1850, and the memory 1810 may be coupled to the interconnect 1860. It should also be noted that one or more components of system 1800 might be located remotely and accessed via a network.

As noted above, in some embodiments, memory 1810 may include program instructions 1815, comprising program instructions configured to implement image editing application 1820, as described herein. Image editing application 1820 may be implemented in various embodiments using any desired programming language, scripting language, or combination of programming languages and/or scripting languages, e.g., C, C++, C#, Java™, Perl, etc. For example, in one embodiment, image editing application 1820 may be JAVA based, while in another embodiments, it may be implemented using the C or C++ programming languages. In other embodiments, image editing application 1820 may be implemented using specific graphic languages specifically for developing programs executed by specialize graphics hardware, such as GPU 1840. In addition, image editing application 1820 may be embodied on memory specifically allocated for use by graphics processor(s) 1840, such as memory on a graphics board including graphics processor(s) 1840. Thus, memory 1810 may represent dedicated graphics memory as well as general-purpose system RAM, in various embodiments. Memory 1810 may in some embodiments also include a data store configured to store image data for one or more input images, intermediate or preview images, and/or output images, in various embodiments. Other information not described herein may be included in memory 1810 and may be used to implement the methods described herein and/or other functionality of computer system 1800.

Network interface 1850 may be configured to enable computer system 1800 to communicate with other computers, systems or machines, such as across a network. Network interface 1850 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1800 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1850 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1840 may be implemented in a number of different physical forms. For example, GPU 1840 may take the form of a dedicated graphics card, an integrated graphics solution and/or a hybrid solution. GPU 1840 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 18, memory 1810 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1840 and the rest of the computer system 1800 may travel through a graphics card slot or other interface, such as interconnect 1860 of FIG. 18.

Computer system 1800 may also include one or more additional I/O interfaces, such as interfaces for one or more user input devices 1870, or such devices may be coupled to computer system 1800 via network interface 1850. For example, computer system 1800 may include interfaces to a keyboard, a mouse or other cursor control device, a joystick, or other user input devices 1870, in various embodiments. Additionally, the computer system 1800 may include one or more displays (not shown), coupled to processors 1830 and/or other components via interconnect 1860 or network interface 1850. Such input/output devices may be configured to allow a user to interact with image editing application 1820 to request various resizing and/or move operations and/or to specify various parameters, thresholds, and/or other configurable options available to the user when editing images executing graphic application 1820. It will be apparent to those having ordinary skill in the art that computer system 1800 may also include numerous other elements not shown in FIG. 18.

Note that program instructions 1815 may be configured to implement an image editing application 1820 as a stand-alone application, or as a module of a graphics application or graphics library, in various embodiments. For example, in one embodiment program instructions 1815 may be configured to implement graphics applications such as painting, publishing, photography, games, animation, and/or other applications, and may be configured to modify images as part of one or more of these graphics applications. In another embodiment, program instructions 1815 may be configured to implement the image editing techniques described herein in one or more functions called by a graphics application executed on GPU 1840 and/or processor(s) 1830. Program instructions 1815 may also be configured to render images and present them on one or more displays as the output of an image editing operation and/or to store image data for modified images in memory 1810 and/or an external storage device(s), in various embodiments. For example, an image editing application 1820 included in program instructions 1815 may utilize GPU 1840 when modifying, rendering, or displaying images in some embodiments.

While various image editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
   using a computer to perform:
   accessing data representing an image;
   receiving input selecting a portion of the image to be translated in at least one dimension in the image, wherein translating the selected portion of the image comprises moving the selected portion of the image to a different location within the image;
   receiving input indicating an amount by which the selected portion of the image is to be moved in a given dimension and a direction of motion in the given dimension;
   applying an edge-weighted seam cropping operation to a region of the image that is adjacent to a region of the image comprising the selected portion of the image in the indicated direction of motion to produce a reduced region of the image;
   applying a resizing operation to a region of the image that is adjacent to the region of the image comprising the selected portion of the image in a direction opposite the indicated direction of motion to produce an expanded region of the image;
   generating a modified image comprising: the reduced region of the image; the expanded region of the image; and the region of the image comprising the selected portion of the image, wherein in the modified image, the region of the image comprising the selected portion of the image has been moved from its previous location in the image by the indicated amount in the indicated direction of motion;
   storing data representing the modified image.

2. The method of claim 1, further comprising, prior to said applying an edge-weighting seam cropping operation, said applying a resizing operation, and said generating a modified image, using the computer to perform dividing the image into three regions in the given dimension, the three regions comprising: the region of the image comprising the selected portion of the image, the region of the image that is adjacent to the region comprising the selected portion of the image in the indicated direction of motion, and the region of the image that is adjacent to the region comprising the selected portion of the image in the direction opposite the indicated direction of motion.

3. The method of claim 1, wherein said applying a resizing operation comprises replicating one or more low cost seams in the region of the image that is adjacent to the region comprising the selected portion of the image in a direction opposite the indicated direction of motion.

4. The method of claim 1, wherein the input selecting a portion of the image to be translated comprises an input indicating an approximate bounding box of an image object to be translated.

5. The method of claim 1, further comprising:
   using the computer to perform:
   receiving input indicating a second amount by which the translated selected portion of the image is to be further moved in a second dimension and a second direction of motion in the second dimension;
   dividing the modified image into three regions in the second dimension, the three regions comprising: a region of the modified image comprising the translated selected portion of the image, a region of the modified image that is adjacent to the region of the modified image comprising the translated selected portion of the image in the second direction of motion, and a region of the modified image that is adjacent to the region of the modified image comprising the translated selected portion of the image in the direction opposite the second direction of motion;
   applying an edge-weighted seam cropping operation to the region of the modified image that is adjacent to the region of the modified image comprising the translated selected portion of the image in the second direction of motion to produce a region of the modified image that is reduced in the second dimension;
   applying a resizing operation to the region of the modified image that is adjacent to the region of the modified image comprising the translated selected portion of the image in the direction opposite the second direction of motion to produce a region of the modified image that is expanded in the second dimension;
   generating a further modified image comprising: the reduced region of the modified image, the expanded region of the modified image, and the region of the modified image comprising the translated selected portion of the image, wherein in the further modified image, the region of the modified image comprising the translated selected portion of the image has been further moved from its previous location in the image by the second indicated amount in the second direction of motion;
   storing data representing the further modified image.

6. The method of claim 1, wherein the input indicating an amount by which the selected portion of the image is to be moved in a given dimension and a direction of motion in the given dimension further indicates a second amount by which the selected portion of the image is to be further moved in a second dimension and a second direction of motion in the second dimension.

7. The method of claim 1, further comprising,
using the computer to perform, prior to said applying an edge-weighted seam cropping operation and said applying a resizing operation:
generating a version of the image having a lower resolution than the image;
applying an edge-weighted seam cropping operation to a region of the lower resolution version of the image that is adjacent to a region of the lower resolution version of the image comprising the selected portion of the image in the indicated direction of motion to produce a reduced region of the lower resolution version of the image;
applying a resizing operation to a region of the lower resolution version of the image that is adjacent to the region of the lower resolution version of the image comprising the selected portion of the image in the direction opposite the indicated direction of motion to produce an expanded region of the lower resolution version of the image; and
generating a preview image comprising: the reduced region of the lower resolution version of the image; the expanded region of the lower resolution version of the image; and the region of the lower resolution version of the image comprising the selected portion of the image, wherein in the preview image, the region of the lower resolution version of the image comprising the selected portion of the image has been moved from its previous location in the lower resolution version of the image by the indicated amount in the indicated direction of motion.

8. The method of claim 7, further comprising:
using the computer to perform:
receiving input indicating that the preview image represents an acceptable result;
wherein said applying an edge-weighted seam cropping operation to a region of the image, said applying a resizing operation to a region of the image, and said generating a modified image are performed in response to said receiving input indicating that the preview image represents an acceptable result.

9. The method of claim 1,
wherein the input indicating an amount by which the selected portion of the image is to be moved in a given dimension and a direction of motion in the given dimension further comprises an input identifying a lowest priority edge or corner of the selected portion of the image; and
wherein said applying an edge-weighted seam cropping operation to a region of the image is dependent on the input identifying the lowest priority edge or corner of the selected portion of the image.

10. A non-transitory, computer-readable storage medium storing program instructions computer-executable to implement:
accessing data representing an image;
receiving input selecting a portion of the image to be translated in at least one dimension in the image, wherein translating the selected portion of the image comprises moving the selected portion of the image to a different location within the image;
receiving input indicating an amount by which the selected portion of the image is to be moved in a given dimension and a direction of motion in the given dimension;
applying an edge-weighted seam cropping operation to a region of the image that is adjacent to a region of the image comprising the selected portion of the image in the indicated direction of motion to produce a reduced region of the image;
applying a resizing operation to a region of the image that is adjacent to the region of the image comprising the selected portion of the image in a direction opposite the indicated direction of motion to produce an expanded region of the image;
generating a modified image comprising: the reduced region of the image; the expanded region of the image; and the region of the image comprising the selected portion of the image, wherein in the modified image the region of the image comprising the selected portion of the image has been moved from its previous location in the image by the indicated amount in the indicated direction of motion;
storing data representing the modified image.

11. The storage medium of claim 10, wherein the program instructions are further computer-executable to implement, prior to said applying an edge-weighting seam cropping operation, said applying a resizing operation, and said generating a modified image, dividing the image into three regions in the given dimension, the three regions comprising: the region of the image comprising the selected portion of the image, the region of the image that is adjacent to the region comprising the selected portion of the image in the indicated direction of motion, and the region of the image that is adjacent to the region comprising the selected portion of the image in the direction opposite the indicated direction of motion.

12. The storage medium of claim 10, wherein said applying a resizing operation comprises replicating one or more low cost seams in the region of the image that is adjacent to the region comprising the selected portion of the image in a direction opposite the indicated direction of motion.

13. The storage medium of claim 10, wherein the input selecting a portion of the image to be translated comprises an input indicating an approximate bounding box of an image object to be translated.

14. The storage medium of claim 10, wherein the program instructions are further computer-executable to implement:
receiving input indicating a second amount by which the translated selected portion of the image is to be further moved in a second dimension and a second direction of motion in the second dimension;
dividing the modified image into three regions in the second dimension, the three regions comprising: a region of the modified image comprising the translated selected portion of the image, a region of the modified image that is adjacent to the region of the modified image comprising the translated selected portion of the image in the second direction of motion, and a region of the modified image that is adjacent to the region of the modified image comprising the translated selected portion of the image in the direction opposite the second direction of motion;
applying an edge-weighted seam cropping operation to the region of the modified image that is adjacent to the region of the modified image comprising the translated selected portion of the image in the second direction of motion to produce a region of the modified image that is reduced in the second dimension;

applying a resizing operation to the region of the modified image that is adjacent to the region of the modified image comprising the translated selected portion of the image in the direction opposite the second direction of motion to produce a region of the modified image that is expanded in the second dimension;

generating a further modified image comprising: the reduced region of the modified image, the expanded region of the modified image, and the region of the modified image comprising the translated selected portion of the image, wherein in the further modified image, the region of the modified image comprising the translated selected portion of the image has been further moved from its previous location in the image by the second indicated amount in the second direction of motion;

storing data representing the further modified image.

15. The storage medium of claim 10, wherein the program instructions are further computer-executable to implement, prior to said applying an edge-weighted seam cropping operation and said applying a resizing operation:

generating a version of the image having a lower resolution than the image;

applying an edge-weighted seam cropping operation to a region of the lower resolution version of the image that is adjacent to a region of the lower resolution version of the image comprising the selected portion of the image in the indicated direction of motion to produce a reduced region of the lower resolution version of the image;

applying a resizing operation to a region of the lower resolution version of the image that is adjacent to the region of the lower resolution version of the image comprising the selected portion of the image in the direction opposite the indicated direction of motion to produce an expanded region of the lower resolution version of the image; and generating a preview image comprising: the reduced region of the lower resolution version of the image; the expanded region of the lower resolution version of the image; and the region of the lower resolution version of the image comprising the selected portion of the image, wherein in the preview image, the region of the lower resolution version of the image comprising the selected portion of the image has been moved from its previous location in the lower resolution version of the image by the indicated amount in the indicated direction of motion.

16. The storage medium of claim 10, wherein the input indicating an amount by which the selected portion of the image is to be moved in a given dimension and a direction of motion in the given dimension further comprises an input identifying a lowest priority edge or corner of the selected portion of the image; and wherein said applying an edge-weighted seam cropping operation to a region of the image is dependent on the input identifying the lowest priority edge or corner of the selected portion of the image.

17. A system, comprising:

one or more processors; and a memory coupled to the one or more processors and storing program instructions executable by the one or more processors to implement:

accessing data representing an image;

receiving input selecting a portion of the image to be translated in at least one dimension in the image, wherein translating the selected portion of the image comprises moving the selected portion of the image to a different location within the image;

receiving input indicating an amount by which the selected portion of the image is to be moved in a given dimension and a direction of motion in the given dimension;

applying an edge-weighted seam cropping operation to a region of the image that is adjacent to a region of the image comprising the selected portion of the image in the indicated direction of motion to produce a reduced region of the image;

applying a resizing operation to a region of the image that is adjacent to the region of the image comprising the selected portion of the image in a direction opposite the indicated direction of motion to produce an expanded region of the image;

generating a modified image comprising: the reduced region of the image; the expanded region of the image; and the region of the image comprising the selected portion of the image, wherein in the modified image, the region of the image comprising the selected portion of the image has been moved from its previous location in the image by the indicated amount in the indicated direction of motion;

storing data representing the modified image.

18. The system of claim 17, wherein the program instructions are further computer-executable to implement, prior to said applying an edge-weighting seam cropping operation, said applying a resizing operation, and said generating a modified image, dividing the image into three regions in the given dimension, the three regions comprising: the region of the image comprising the selected portion of the image, the region of the image that is adjacent to the region comprising the selected portion of the image in the indicated direction of motion, and the region of the image that is adjacent to the region comprising the selected portion of the image in the direction opposite the indicated direction of motion.

19. The system of claim 17, wherein said applying a resizing operation comprises replicating one or more low cost seams in the region of the image that is adjacent to the region comprising the selected portion of the image in a direction opposite the indicated direction of motion.

20. The system of claim 17, wherein the input selecting a portion of the image to be translated comprises an input indicating an approximate bounding box of an image object to be translated.

21. The system of claim 17, wherein the program instructions are further computer-executable to implement:

receiving input indicating a second amount by which the translated selected portion of the image is to be further moved in a second dimension and a second direction of motion in the second dimension;

dividing the modified image into three regions in the second dimension, the three regions comprising: a region of the modified image comprising the translated selected portion of the image, a region of the modified image that is adjacent to the region of the modified image comprising the translated selected portion of the image in the second direction of motion, and a region of the modified image that is adjacent to the region of the modified image comprising the translated selected portion of the image in the direction opposite the second direction of motion; applying an edge-weighted seam cropping operation to the region of the modified image that is adjacent to the region of the modified image comprising the translated selected portion of the image in the second direction of motion to produce a region of the modified image that is reduced in the second dimension;

applying a resizing operation to the region of the modified image that is adjacent to the region of the modified image comprising the translated selected portion of the image in the direction opposite the second direction of motion to produce a region of the modified image that is expanded in the second dimension;

generating a further modified image comprising: the reduced region of the modified image, the expanded region of the modified image, and the region of the modified image comprising the translated selected portion of the image, wherein in the further modified image, the region of the modified image comprising the translated selected portion of the image has been further moved from its previous location in the image by the second indicated amount in the second direction of motion;

storing data representing the further modified image.

22. The system of claim 17, wherein the program instructions are further computer-executable to implement, prior to said applying an edge-weighted seam cropping operation and said applying a resizing operation:

generating a version of the image having a lower resolution than the image;

applying an edge-weighted seam cropping operation to a region of the lower resolution version of the image that is adjacent to a region of the lower resolution version of the image comprising the selected portion of the image in the indicated direction of motion to produce a reduced region of the lower resolution version of the image;

applying a resizing operation to a region of the lower resolution version of the image that is adjacent to the region of the lower resolution version of the image comprising the selected portion of the image in the direction opposite the indicated direction of motion to produce an expanded region of the lower resolution version of the image; and generating a preview image comprising: the reduced region of the lower resolution version of the image; the expanded region of the lower resolution version of the image; and the region of the lower resolution version of the image comprising the selected portion of the image, wherein in the preview image, the region of the lower resolution version of the image comprising the selected portion of the image has been moved from its previous location in the lower resolution version of the image by the indicated amount in the indicated direction of motion.

23. The system of claim 17, wherein the input indicating an amount by which the selected portion of the image is to be moved in a given dimension and a direction of motion in the given dimension further comprises an input identifying a lowest priority edge or corner of the selected portion of the image; and wherein said applying an edge-weighted seam cropping operation to a region of the image is dependent on the input identifying the lowest priority edge or corner of the selected portion of the image.

24. The system of claim 17, wherein the one or more processors comprise at least one of a general-purpose central processing unit (CPU) or a graphics processing unit (GPU).

\* \* \* \* \*